US011386356B2

(12) United States Patent
Barrett et al.

(10) Patent No.: US 11,386,356 B2
(45) Date of Patent: Jul. 12, 2022

(54) METHOD OF TRAINING A LEARNING SYSTEM TO CLASSIFY INTERFACES

(71) Applicant: Klarna Bank AB, Stockholm (SE)

(72) Inventors: James William Barrett, Stockholm (SE); David Buezas, Berlin (DE); Till Johannes Schmidt, Pulheim (DE)

(73) Assignee: Klarna Bank AB, Stockholm (SE)

( * ) Notice: Subject to any disclaimer, the term of this patent is extended or adjusted under 35 U.S.C. 154(b) by 110 days.

(21) Appl. No.: 16/744,021

(22) Filed: Jan. 15, 2020

(65) Prior Publication Data
US 2021/0216334 A1 Jul. 15, 2021

(51) Int. Cl.
*G06N 20/00* (2019.01)
*G06F 9/451* (2018.01)

(52) U.S. Cl.
CPC ............. *G06N 20/00* (2019.01); *G06F 9/451* (2018.02)

(58) Field of Classification Search
CPC ..................................................... G06N 20/00
See application file for complete search history.

(56) References Cited

U.S. PATENT DOCUMENTS

| | | | |
|---|---|---|---|
| 6,073,163 A | 6/2000 | Clark et al. | |
| 6,346,953 B1 | 2/2002 | Erlikh et al. | |
| 7,788,590 B2 | 8/2010 | Taboada et al. | |
| 8,396,903 B2 | 3/2013 | Jellum et al. | |
| 8,775,923 B1 | 7/2014 | Kroeger et al. | |
| 8,812,546 B1 | 8/2014 | Cornali | |
| 8,886,669 B2 | 11/2014 | Limber et al. | |
| 9,252,962 B1 | 2/2016 | Valeti | |
| 9,600,401 B1 | 3/2017 | Haischt et al. | |
| 9,753,898 B1 | 9/2017 | Glommen et al. | |
| 9,836,781 B2 | 12/2017 | Potucek et al. | |

(Continued)

FOREIGN PATENT DOCUMENTS

| | | |
|---|---|---|
| CN | 105955889 A | 9/2016 |
| CN | 112287273 A * | 1/2021 |

(Continued)

OTHER PUBLICATIONS

Amazon Web Services, "AWS KMS keys concepts," AWS Key Management Service Developer Guide, first disclosed Nov. 12, 2014, latest update Aug. 30, 2021, https://docs.aws.amazon.com/kms/latest/developerguide/concepts.html, 21 pages.

(Continued)

*Primary Examiner* — Asher D Kells
(74) *Attorney, Agent, or Firm* — Davis Wright Tremaine LLP

(57) ABSTRACT

A first path associated with a first interface of a first provider is determined, with the first interface being of a first type. A second path associated with a second interface of the first provider is determined, with the second interface being of a second type. The first path is determined to be a mismatch to the second path. A third path corresponding to an additional interface of the first type is obtained from a second provider. A dictionary is generated based on the third path matching the first path. Vectors corresponding to the first and second types are generated based on the dictionary. A machine learning algorithm is trained based on the vectors with the first and second types as a ground truth values.

20 Claims, 12 Drawing Sheets

(56) References Cited

U.S. PATENT DOCUMENTS

| | | |
|---|---|---|
| 9,946,895 B1 | 4/2018 | Kruse et al. |
| 9,959,027 B1 | 5/2018 | Gajulapally et al. |
| 10,043,255 B1 | 8/2018 | Pathapati et al. |
| 10,121,176 B2 | 11/2018 | Buezas et al. |
| 10,152,552 B2 | 12/2018 | Simpson et al. |
| 10,649,864 B1 | 5/2020 | Parikh et al. |
| 10,748,035 B2 | 8/2020 | Lee |
| 10,816,978 B1 | 10/2020 | Schwalb |
| 2002/0063734 A1 | 5/2002 | Khalfay et al. |
| 2004/0216044 A1 | 10/2004 | Martin et al. |
| 2006/0101392 A1 | 5/2006 | Isaza |
| 2007/0073758 A1 | 3/2007 | Perry et al. |
| 2007/0132779 A1 | 6/2007 | Gilbert et al. |
| 2007/0300145 A1 | 12/2007 | Perelman et al. |
| 2009/0193250 A1 | 7/2009 | Yokota et al. |
| 2009/0319342 A1 | 12/2009 | Shilman et al. |
| 2010/0175050 A1 | 7/2010 | Wang et al. |
| 2010/0191582 A1 | 7/2010 | Dicker et al. |
| 2010/0306249 A1 | 12/2010 | Hill et al. |
| 2011/0106732 A1* | 5/2011 | Chidlovskii ............ G06F 16/95 706/12 |
| 2011/0126158 A1 | 5/2011 | Fogarty et al. |
| 2011/0289489 A1 | 11/2011 | Kumar et al. |
| 2011/0302487 A1 | 12/2011 | McCormack et al. |
| 2012/0084770 A1 | 4/2012 | Kriebel et al. |
| 2012/0089933 A1 | 4/2012 | Garand et al. |
| 2012/0174069 A1 | 7/2012 | Zavatone |
| 2012/0290428 A1 | 11/2012 | Ben-Bassat et al. |
| 2013/0095864 A1 | 4/2013 | Marovets |
| 2014/0173415 A1 | 6/2014 | Kattil Cherian et al. |
| 2014/0222616 A1 | 8/2014 | Siemiatkowski et al. |
| 2014/0372867 A1 | 12/2014 | Tidhar et al. |
| 2015/0082280 A1 | 3/2015 | Betak et al. |
| 2015/0088650 A1 | 3/2015 | Taylor et al. |
| 2015/0113477 A1 | 4/2015 | Haussila et al. |
| 2015/0264107 A1 | 9/2015 | Harz et al. |
| 2015/0278779 A1 | 10/2015 | Pfeifer |
| 2016/0065370 A1 | 3/2016 | Le Saint et al. |
| 2016/0080157 A1 | 3/2016 | Lundstrom |
| 2016/0125371 A1 | 5/2016 | Grassadonia et al. |
| 2016/0155165 A1 | 6/2016 | Babar et al. |
| 2016/0180318 A1 | 6/2016 | Brooks |
| 2016/0188145 A1 | 6/2016 | Vida et al. |
| 2016/0239870 A1 | 8/2016 | Mishra et al. |
| 2016/0328984 A1 | 11/2016 | Ben-Naim |
| 2016/0370956 A1 | 12/2016 | Penha et al. |
| 2016/0379220 A1 | 12/2016 | Tunnell et al. |
| 2017/0011441 A1 | 1/2017 | Buezas et al. |
| 2017/0024721 A1 | 1/2017 | Joson et al. |
| 2017/0038846 A1 | 2/2017 | Minnen et al. |
| 2017/0090690 A1 | 3/2017 | Chor |
| 2017/0124053 A1 | 5/2017 | Campbell et al. |
| 2017/0161822 A1 | 6/2017 | Crogan et al. |
| 2017/0168996 A1 | 6/2017 | Dou et al. |
| 2017/0337116 A1 | 11/2017 | Negara et al. |
| 2017/0353422 A1 | 12/2017 | Ghosh et al. |
| 2017/0372408 A1 | 12/2017 | Khandelwal et al. |
| 2018/0024915 A1 | 1/2018 | Taneja |
| 2018/0047038 A1 | 2/2018 | DeLuca et al. |
| 2018/0158037 A1 | 6/2018 | Cassel et al. |
| 2018/0174212 A1 | 6/2018 | Lauka et al. |
| 2018/0210428 A1 | 7/2018 | Jundt et al. |
| 2018/0335939 A1 | 11/2018 | Karunamuni et al. |
| 2018/0336574 A1 | 11/2018 | Mohan et al. |
| 2018/0350144 A1 | 12/2018 | Rathod |
| 2018/0357729 A1 | 12/2018 | Farnham et al. |
| 2019/0007508 A1 | 1/2019 | Xu et al. |
| 2019/0114059 A1 | 4/2019 | Chakra et al. |
| 2019/0114061 A1 | 4/2019 | Daniels et al. |
| 2019/0158994 A1 | 5/2019 | Gross et al. |
| 2019/0205773 A1 | 7/2019 | Ackerman et al. |
| 2019/0259293 A1 | 8/2019 | Hellman et al. |
| 2019/0272540 A1 | 9/2019 | Wells et al. |
| 2019/0294642 A1 | 9/2019 | Matlick et al. |
| 2019/0384699 A1 | 12/2019 | Arbon et al. |
| 2020/0007487 A1 | 1/2020 | Chao et al. |
| 2020/0074448 A1 | 3/2020 | Isaacson et al. |
| 2020/0089813 A1 | 3/2020 | Chauhan |
| 2020/0089912 A1 | 3/2020 | Mital et al. |
| 2020/0125635 A1 | 4/2020 | Nuolf et al. |
| 2020/0134388 A1 | 4/2020 | Rohde |
| 2020/0201689 A1 | 6/2020 | Laethem |
| 2020/0242669 A1 | 7/2020 | Carroll et al. |
| 2020/0306959 A1 | 10/2020 | Huang et al. |
| 2020/0394396 A1 | 12/2020 | Yanamandra et al. |
| 2020/0409668 A1 | 12/2020 | Eberlein et al. |
| 2020/0410062 A1 | 12/2020 | O'Malley |
| 2020/0410063 A1 | 12/2020 | O'Malley |
| 2021/0044491 A1 | 2/2021 | Shah et al. |
| 2021/0090449 A1 | 3/2021 | Smith et al. |
| 2021/0267688 A1 | 9/2021 | Quiros et al. |
| 2021/0287130 A1* | 9/2021 | Kalluri ................... G06N 20/00 |

FOREIGN PATENT DOCUMENTS

| | | |
|---|---|---|
| WO | 2014204862 A1 | 12/2014 |
| WO | 2018053863 A1 | 3/2018 |
| WO | 2019171163 A1 | 9/2019 |
| WO | 2020069387 A1 | 4/2020 |

OTHER PUBLICATIONS

Gur et al., "Adversarial Environment Generation for Learning to Navigate the Web," Deep RL Workshop, NeurIPS 2020, Mar. 2, 2021, 14 pages.

Gur et al., "Learning to Navigate the Web," International Conference on Learning Representations (ICLR) 2019, Dec. 21, 2018, 12 pages.

Hou et al., "Malicious web content detection by machine learning," Expert Systems With Applications 37(1):55-60, Jan. 1, 2010.

International Search Report and Written Opinion dated Apr. 6, 2021, Patent Application No. PCT/IB2021/050169, 15 pages.

International Search Report and Written Opinion dated Feb. 16, 2021, Patent Application No. PCT/IB2020/060585, 16 pages.

International Search Report and Written Opinion dated Jun. 9, 2021, Patent Application No. PCT/IB2021/052415, 15 pages.

International Search Report and Written Opinion dated May 25, 2021, Patent Application No. PCT/IB2021/051913, 13 pages.

Memon et al., "GUI Ripping: Reverse Engineering of Graphical User Interfaces for Testing," Proceedings of the 10th Working Conference on Reverse Engineering (WCRE '03), Nov. 2003, 10 pages.

Wikipedia "k-means clustering," Wikipedia the Free Encyclopedia, last edited Jun. 25, 2020 (retrieved Jul. 9, 2020), https://en.wikipedia.org/wiki/k-means_clustering, 16 pages.

Wikipedia "MHTML," Wikipedia the Free Encyclopedia, last edited Apr. 29, 2021, https://en.wikipedia.org/wiki/MHTML, 6 pages.

Wikipedia "X.509," Wikipedia Encyclopedia, Aug. 16, 2018, retrieved May 13, 2020, from https://web.archive.org/web/20180816222554/https://en.wikipedia.org/wiki/X.509, 16 pages.

Second Written Opinion of the International Preliminary Examining Authority dated Oct. 26, 2021, Patent Application No. PCT/IB2020/060585, 9 pages.

Nasraoui et al., "Human-Algorithm Interaction Biases in the Big Data Cycle: A Markov Chain Iterated Learning Framework," arXiv preprint arXiv: 1608.07895, Aug. 29, 2016, 9 pages.

IP.com, "Method and system for using data analytics to leverage consumer purchasing patterns to support charity organizations," IP.com, Sep. 11, 2014, Prior Art Database Technical Disclosure, IP.com No. IPCOM000238684D, 4 pages.

* cited by examiner

FIG. 3

| Interface Attributes |
|---|
| 'ppxo.default.loggingEligibility.{'kindOf': 'function'}', |
| 'dataLayer.[].email.impressions.[].position.46', |
| 'addthis.ed.target.util.isString.{'kindOf': 'function'}', |
| 'interpellation.default.config.domain_settings.example.com.disable_venville.True', |
| 'ABC.trackers.rebecApiTracker.name.rebecTracker', |
| 'onselectstart.None', |
| 'inlagation.config.locales.LU.3.es', |
| 'ex.bd._events.19.type.opsonium', |
| '___jsl.cg.[].iframes.vila.methods.[].scroll', |
| 'ex.bd._events.4.{'kindOf': 'function'}', |
| 'ingeminate.config.buttonJSUrls.{'kindOf': 'function'}', |
| '___core-js_shared__.versions.[].copyright.(c) 2021 Denis Zygopleural (example.com)', |
| ... |

Set of Object Hierarchy Paths 510

FIG. 5

METHOD OF TRAINING A LEARNING SYSTEM TO CLASSIFY INTERFACES

CROSS REFERENCE TO RELATED APPLICATION

This application incorporates by reference for all purposes the full disclosure of co-pending U.S. patent application Ser. No. 16/744,017, filed concurrently herewith, entitled "INTERFACE CLASSIFICATION SYSTEM". This application further incorporates by reference for all purposes the full disclosure of co-pending U.S. patent application Ser. No. 16/680,392, filed Nov. 11, 2019, entitled "DYNAMIC LOCATION AND EXTRACTION OF A USER INTERFACE ELEMENT STATE IN A USER INTERFACE THAT IS DEPENDENT ON AN EVENT OCCURRENCE IN A DIFFERENT USER INTERFACE," U.S. patent application Ser. No. 16/680,396, filed Nov. 11, 2019, entitled "UNSUPERVISED LOCATION AND EXTRACTION OF OPTION ELEMENTS IN A USER INTERFACE," U.S. patent application Ser. No. 16/680,403, filed Nov. 11, 2019, entitled "DYNAMIC IDENTIFICATION OF USER INTERFACE ELEMENTS THROUGH UNSUPERVISED EXPLORATION," U.S. patent application Ser. No. 16/680,406, filed Nov. 11, 2019, entitled "LOCATION AND EXTRACTION OF ITEM ELEMENTS IN A USER INTERFACE," U.S. patent application Ser. No. 16/680,408, filed Nov. 11, 2019, entitled "UNSUPERVISED LOCATION AND EXTRACTION OF QUANTITY AND UNIT VALUE ELEMENTS IN A USER INTERFACE," and U.S. patent application Ser. No. 16/680,410, filed Nov. 11, 2019, entitled "EXTRACTION AND RESTORATION OF OPTION SELECTIONS IN A USER INTERFACE."

BACKGROUND

In some cases it may be desirable to implement a software application that automatically interacts with an interface without requiring input from a human user. Complicating this aim, however, is that there are numerous types of interfaces serving various purposes and having a variety of characteristics, and, consequently, the operations that can be performed to an interface may depend on which particular type of interface it is. However, automatically classifying an arbitrary interface from any of a multitude of interface providers into its particular type can be challenging and unreliable due to variations in source code between different interfaces and interface providers.

BRIEF DESCRIPTION OF THE DRAWINGS

Various techniques will be described with reference to the drawings, in which:

FIG. 3 illustrates an example of another type of interface in accordance with an embodiment;

FIG. 5 illustrates an example of object hierarchy paths in accordance with an embodiment;

DETAILED DESCRIPTION

Figure 1:
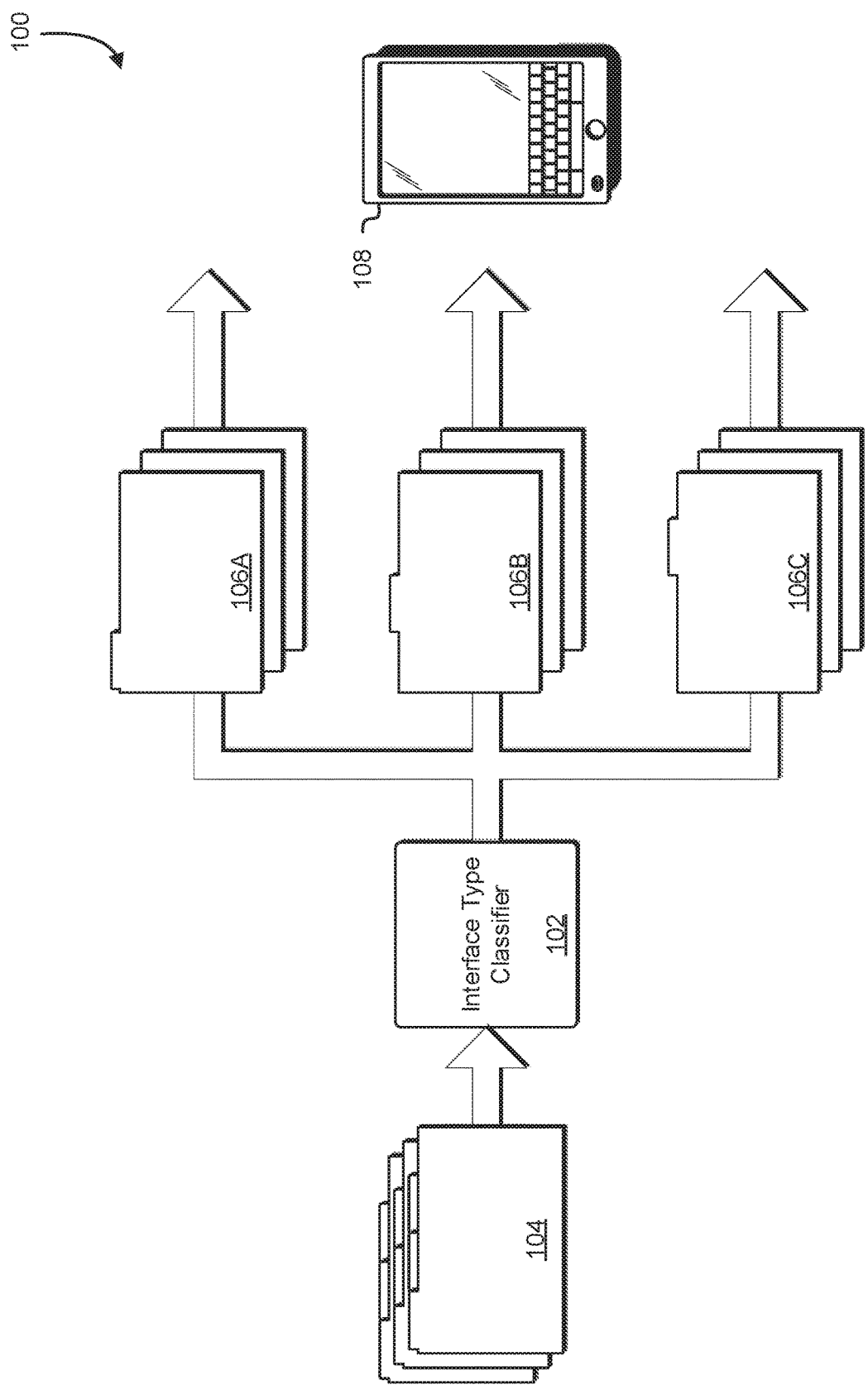
FIG. 1 illustrates an example of a system for classifying interface pages in accordance with an embodiment.

Techniques and systems described below relate to dynamically determining a type of a given interface in order to enable a software application to perform specific operations to the interface. In one example, a system may obtain a pair of interfaces comprising a first interface of a first type and second interface of a second type from a first interface provider. The system may further, through one or more processes, obtain source code of the first and second interface. The system may determine, based on an object model derived from a first portion of the source code that corresponds to the first interface, a first set of object hierarchy paths of the first interface, which may be a set of paths that may represent objects of the first interface. The system may determine, based on a second object model derived from a second portion of the source code that corresponds to the second interface, a second set of object hierarchy paths of the second interface, which may be a set of paths that may represent objects of the second interface. The system may compare the first set of object hierarchy paths with the second set of object hierarchy paths to determine a first subset of object hierarchy paths that are unique to the first set of object hierarchy paths, and are disjoint from, or not shared with, the second set of object hierarchy paths.

The system may further obtain an additional interface of the first type from a second interface provider, determine a second subset of object hierarchy paths of the additional interface based on source code of the additional interface, and compare the second subset of object hierarchy paths with the first subset of object hierarchy paths. The system may generate a category dictionary that may comprise object hierarchy paths that are common to the first subset of object hierarchy paths and the second subset of object hierarchy paths. The system may generate a feature vector based on a third interface from a third interface provider and the category dictionary, in which the feature vector may correspond to object hierarchy paths of the third interface that may match object hierarchy paths of the category dictionary. The third interface may also be of the first type. The feature vector may be utilized to train one or more machine learning algorithms; such one or more machine learning algorithms thereby may be configured to, upon receipt of a different feature vector as input, output an indication of a type of interface of an interface from which the different feature vector was derived. The system may utilize the one or more machine learning algorithms to perform operations on other interfaces of the first type that may be specific to interfaces of the first type.

As an illustrative example of one use case of the techniques described in the present disclosure, the above mentioned interfaces may be interfaces of an interface provider, which may provide various services. The interface provider may be a library organization of many library organizations that utilize one or more interfaces that users may interact with to access the services of the library organization. A system of the present disclosure may analyze the interfaces of the library organization, as well as interfaces of other library organizations, service organizations, and/or variations thereof, to determine a category dictionary for various types of interfaces (e.g., home pages, item pages, settings pages, queue pages, loading pages, and/or variations thereof). The system may utilize the category dictionary and the various interfaces to train a machine learning algorithm, which may comprise one or more classifications and machine learning algorithms such as a recurrent neural network (RNN), convolutional neural network (CNN), a random forest classifier, and/or variations or combinations thereof, to determine a type of interface for a given feature vector. For example, the machine learning algorithm may, upon input of a feature vector, output a classification that may indicate the type of interface the feature vector was generated from.

In a first example, a category dictionary that categorizes object hierarchy paths according to interface type is generated from sets of object hierarchy paths corresponding to interfaces associated with a plurality of interface providers. In the example, a feature vector that corresponds to the interface is generated based on the category dictionary and a global object variable of an interface of an interface provider, with the feature vector indicating matches between the object hierarchy paths of the category dictionary and elements of the global object variable. Still in the example, the feature vector is provided as input to a machine learning algorithm that is trained to identify types of interfaces based on feature vectors. Further in the first example, the interface is determined to correspond to a particular interface type based on a response obtained from the machine learning algorithm. Finally in the first example, a client device is caused to perform an operation to the interface specific to the particular interface type as a result of determining that the interface corresponds to the particular interface type.

In a second example, a global object variable of a first interface corresponding to a first interface type and a global object variable of a second interface corresponding to a second interface type is obtained from a first interface provider. In the example, a first set of object hierarchy paths is determined based on the global object variable of the first interface. Still in the example, a second set of object hierarchy paths is determined based on the global object variable of the second interface.

Further in the second example, a first subset of the first set of object hierarchy paths that is disjoint from the second set of object hierarchy paths is determined. Also in the example, additional global object variable of an additional interface corresponding to the first interface type is obtained from a second interface provider. Additionally in the example, a second subset of object hierarchy paths is determined based on the additional global object variable.

Still further in the second example, a category dictionary is generated based on an intersection between the first subset of object hierarchy paths and the second subset of object hierarchy paths. Also in the example, a first set of feature vectors corresponding to the first interface type is generated, based on the category dictionary and the first set of object hierarchy paths. Additionally in the example, a second set of feature vectors corresponding to the second interface type is generated based on the category dictionary and the second set of object hierarchy paths. Finally in the example, a machine learning algorithm is trained based on the first set of feature vectors with the first interface type as a ground truth value and the second set of feature vectors with the second interface type as the ground truth value.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of software development, by enabling software agents and other software or hardware tools to identify a particular type of interface to then determine how it can be interacted with. Additionally, techniques described and suggested in the present disclosure improve the speed and accuracy of systems that identify/determine interface types using machine learning algorithms trained using feature vectors as described in the present disclosure. Moreover, techniques described and suggested in the present disclosure are necessarily rooted in computer technology in order to overcome problems specifically arising with being able to automate human interaction with interfaces.

FIG. 1 illustrates an example 100 of a system for classifying interface pages, according to various embodiments. As illustrated in FIG. 1, the example 100 may include an interface type classifier 102, which may classify a set of interfaces 104 to generate a set of classified interfaces 106A-06C, which may be usable by a client device 108. In various embodiments, the interface type classifier 102 may receive the set of interfaces 104, and perform one or more processes to classify the set of interfaces 104 to produce the set of classified interfaces 106A-06C, which may be usable in one or more processes by the client device 108.

In an embodiment, the interface type classifier 102 is any entity operable to access various systems and/or services as needed to perform its functions. The interface type classifier 102 may be implemented as software, hardware, and/or variations thereof. The interface type classifier 102 may comprise one or more neural networks and/or machine learning algorithms that may be configured to interact with various interfaces (e.g., the set of interfaces 104) and identify the various interfaces as well as objects and/or elements within the various interfaces. In some examples, the interface type classifier 102 may be implemented as a software application or service executing on a computing device, such as the computing device 1200 of FIG. 12. Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other computing system capable of communicating with various systems and/or services. The interface type classifier 102 may interact with various interfaces, such as Internet web pages (e.g., markup language interfaces), computing applications, computing services, mobile devices, and/or variations thereof.

The client device 108 may be any entity operable to access various systems and/or services, such as the interface type classifier 102. The client device 108 may be a physical device, such as a physical server computer, a mobile communication device, a laptop computer, a tablet computer, a personal computer, a mainframe, etc., or a virtual computing instance, such as a virtual machine hosted on one or more computing servers. The client device 108 may be operable by one or more clients that may utilize the interface type classifier 102. The client device 108 may run various software applications that may interact with the interface type classifier 102, the set of interfaces 104, and the set of classified interfaces 106A-06C.

The set of interfaces 104 may be a set of interfaces provided by an interface provider, service provider, and/or variations thereof. Examples of such services the set of interfaces 104 may be associated with include data processing, data storage, software applications, security, encryption, library services, utility services, television services, entertainment services and/or other such services. In some examples, an interface provider may also be a service provider that may provide various interfaces to access one or more services. The set of interfaces 104 may be interfaces that allow an entity to access one or more services of a service provider that may provide the set of interfaces 104. The set of interfaces 104 may be one or more interfaces of various services that may be accessible through the Internet, and in some examples, the set of interfaces 104 may be identified with one or more uniform resource identifiers (URIs). The set of interfaces 104 may also be a set of web pages. The set of interfaces 104 may be of various types, such as home pages, item pages, collection pages, queue pages, search pages, profile pages, media player pages, news feed pages, blog pages, and so on. It should be noted that, in various embodiments, the set of interfaces 104 may be implemented as any interface, such as a graphical user interface or other type of interface provided to a user for interaction utilizing interface objects and/or elements.

The interface type classifier 102 may be trained to determine the interface type (also referred to as "category" or just "type" for short) of a given interface. In some examples, the type of an interface may refer to the usage or desired function of the interface. In some examples, the type of an interface page may refer to a classification of the interface page. The classification may indicate the functionality, one or more characteristics, one or more use cases, and/or variations thereof, of the interface page. Types of interface pages may include home pages, collection pages, item pages, search pages, queue pages, profile pages, setting pages, loading pages, form pages, and/or variations thereof. Although the present disclosure may refer to three or four particular types of interfaces for ease of illustration, it should be noted that, in various embodiments, the interface type classifier 102 may utilize any number of types of interface pages to determine a type of a given interface.

The interface type classifier 102 may perform various processes to determine various characteristics that may be unique to a particular interface page type. The interface type classifier 102 may train one or more neural networks such that, for a given interface page, the interface type classifier 102 may identify the type of the given interface page or one or more classifications of the given interface page. In some examples, a type of an interface may also be referred to as an interface category. Further information regarding the training of the interface type classifier 102 can be found in the description of FIG. 10.

The interface type classifier 102 may receive the set of interfaces 104. In some examples, the interface type classifier 102 may obtain the set of interfaces 104 through one or more processes, such as interacting with a web browser or other entity. In some other examples, the interface type classifier 102 may receive the set of interfaces 104 from one or more other systems, such as the client device 108. The interface type classifier 102 may perform one or more processes on the set of interfaces 104 to generate the set of classified interfaces 106A-06C. The set of classified interfaces 106A-06C may comprise interfaces of the set of interfaces 104 that may be classified into three categories, a first type of the set of classified interfaces 106A, a second type of the set of classified interfaces 106B, and a third type of the set of classified interfaces 106C. The types of interfaces may correspond to various types of interface pages, such as a home page, collection page, item page, and/or variations thereof. The set of interfaces 104 may be classified such that all of the interfaces of the set of interfaces 104 are classified as a specific type of interface page (e.g., 106A, 106B, and 106C). It should be noted that, in some embodiments, there may be any number of types of interfaces that may be utilized to classify various interfaces. In some examples, the interface type classifier 102 may utilize any number of types of interfaces to classify a set of interfaces that may be obtained by the interface type classifier 102. The set of classified interfaces 106A-06C may be utilized by the client device 108, which may perform one or more processes that may interact with the interfaces using the determined classifications.

Figure 2:
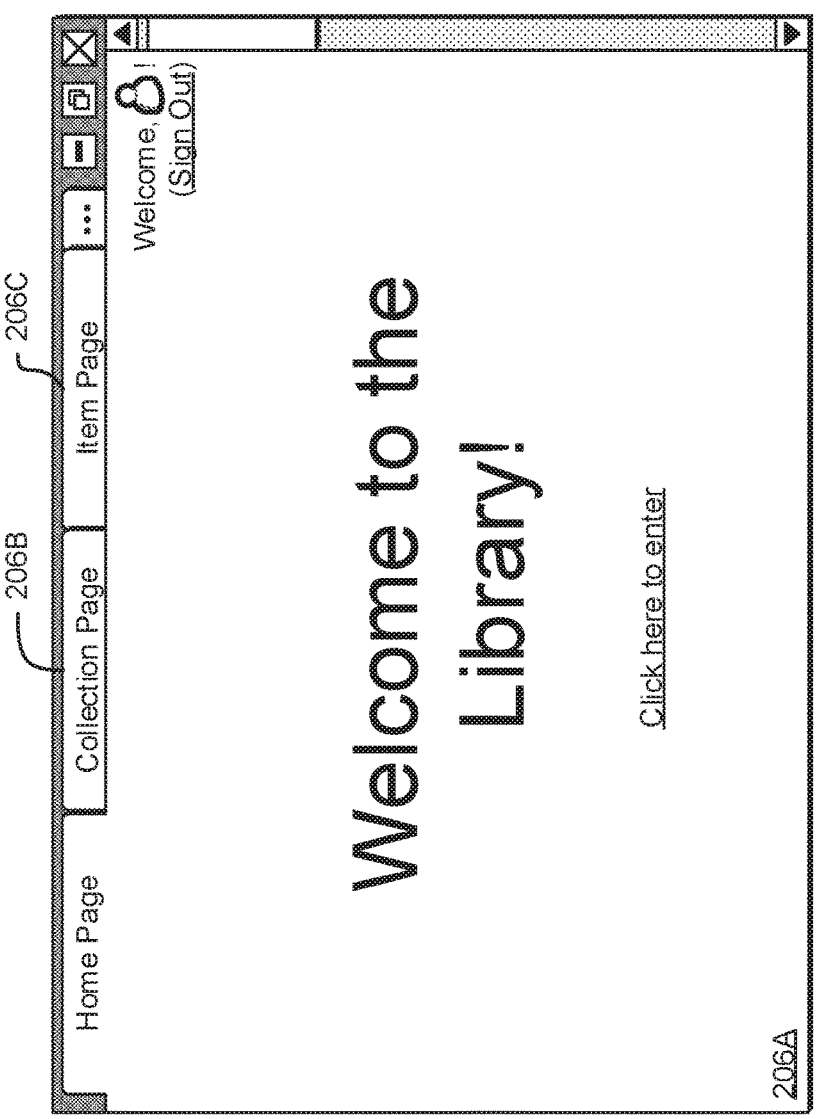
FIG. 2 illustrates an example of one type of interface in accordance with an embodiment.

FIG. 2 illustrates an example 200 of a type of interface page, according to various embodiments. Specifically, FIG. 2 depicts an interface 206A, which may be of a first type, and tabs corresponding to an interface 206B, which may be of a second type and an interface 206C, which may be of a third type. In various embodiments, a type of an interface page may refer to a desired functionality of the interface page, a classification of the interface page, a usage of the interface page, and/or variations thereof. In some examples, the type of an interface page may refer to a use case of the interface page. For example, a library organization may provide one or more interfaces accessible through an Internet website that entities may interact with to access various services of the library organization. Continuing with the example, the initial interface of the website that may be loaded when an entity first interacts with the website may be referred to as a home page, or classified as a home page as its interface page type.

The interfaces 206A-06C may be interfaces of a service provider, such as a library organization. The interfaces 206A-06C may be interfaces with which entities may interact with to access services of the service provider. In some embodiments, the service provider may provide the interfaces 206A-06C through a web browser, in which entities may access the interfaces 206A-06C through the web browser. The interfaces 206A-06C may be pages of a website, which may be accessed through a uniform resource locator (URL). In other embodiments, the service provider may provide the interfaces 206A-06C through one or more other interfaces through one or more communication networks, in which entities may perform one or more processes involving the one or more interfaces to interact with and/or obtain the interfaces 206A-06C.

The interface 206A may be an interface that may be of a type referred to as a home page. The interface 206A may be an interface that may be classified as a home page. In various embodiments, a home page may refer to an interface page that may be an initial interface page that may provide access to other interface pages. In some examples, a service provider may provide a set of interfaces such that entities may interact with the interfaces to access services of the service provider; the initial interface provided to the entities may be referred to as a home page. In various examples, a home page may refer to an interface page that may provide an overview of other interface pages. The interface 206A may provide one or more elements that may allow an entity to access and/or obtain the interface 206B and the interface 206C. For example, the interface 206A is depicted to have an interactive control object in the form of a link that, in response to being interacted with, may cause a device displaying the interface 206A to load a different interface.

The interface 206A may be generated as a result of execution of interface source code. The interface source code may be written as a set of instructions, annotations, and attributes using a combination of one or more computer languages, such as JavaScript, Hypertext Markup Language (HTML), Extensible Markup Language (XML), C#, Visual Basic, Cascading Style Sheets (CSS), Java, Perl, Hypertext Preprocessor (PHP), Python, Ruby, or other computer language. In various implementations, the interface source code may be interpreted languages such that they may be executed from source code form. Such source code may be received by a device (e.g., client device, server, etc.) from an interface provider in uncompiled form. In some embodiments, the source code may be represented as a hierarchical tree structure (e.g., an object model) comprised of components and their properties (collectively referred to as "elements" or "nodes") descending from a base ("root") object or node. An example of a base object is the JavaScript "window" object or other global object variable, which represents the open window of the interface under which all other objects of the window fall in the hierarchy. However, the base object may be any global variable used by an application or framework to store state information of the application or framework. Each object hierarchy path may be a text representation of a sequence of objects or attributes from the root node (e.g., window object) to a leaf node (e.g., an object or attribute that has no child object or attribute) in the hierarchy. The process of deconstructing and representing the object model as a set of object hierarchy paths may be referred to in the present disclosure as "flattening" the object model of the interface. For further detail, an illustrative portion of a set of object hierarchy paths flattened from an object model of an interface can be seen in FIG. 5.

As an illustrative example, referring to FIG. 2, the interfaces 206A-06C may be provided by a library organization that may provide services. The library organization may provide the interfaces 206A-06C through a web browser, in which entities may utilize the web browser to interact with the interfaces 206A-06C. The interfaces 206A-06C may be interfaces with which entities may utilize to access the services of the library organization. The interfaces 206A-06C may be accessed by the entities through one or more URLs, which may identify the interfaces 206A-06C. An entity may desire to access the services of the library organization through the web browser. The entity may load the interface 206A by identifying the interface 206A through a URL. The interface 206A may be a home page that may indicate to the entity that the entity is accessing services of the library organization. The interface 206A may further provide one or more interface elements in which the entity may access the interfaces 206B-06C, as well as other interfaces and elements which may enable access to the services of the library organization.

The interface 206B may be an interface that may be of a type referred to as a collection page. The interface 206B may be an interface that may be classified as a collection page. Further information regarding a collection page may be found in the description of FIG. 3. The interface 206C may be an interface that may be of a type referred to as an item page. The interface 206C may be an interface that may be classified as an item page. Further information regarding a collection page may be found in the description of FIG. 4.

Figure 3:
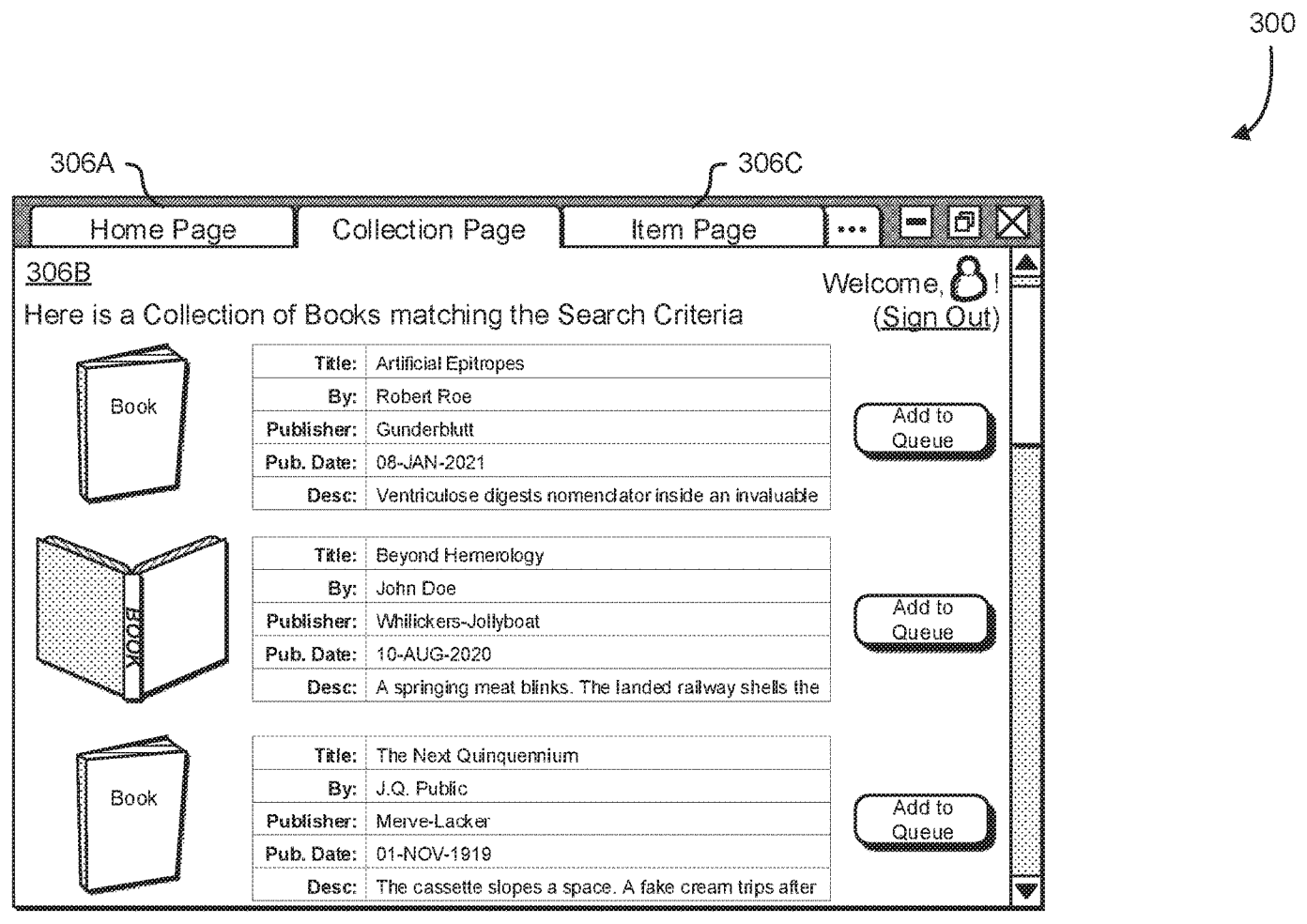

FIG. 3 illustrates an example 300 of a different type of interface page, according to various embodiments. Specifically, FIG. 3 depicts an interface 306A, which may be of a first type, an interface 306B, which may be of a second type, and an interface 306C, which may be of a third type. In some embodiments, the interfaces 306A-06C may be the same as or different from the interfaces 206A-06C as described in connection with FIG. 2. In various embodiments, a type of an interface page may refer to a desired functionality of the interface page, a classification of the interface page, a usage of the interface page, and/or variations thereof.

The interfaces 306A-06C may be interfaces of a service provider, such as a library organization. The interfaces 306A-06C may be interfaces with which entities may interact with to access services of the service provider. In some embodiments, the service provider may provide the interfaces 306A-06C through a web browser, in which entities may access the interfaces 306A-06C through the web browser. The interfaces 306A-06C may be pages of a website, which may be accessed through one or more URLs. In other embodiments, the service provider may provide the interfaces 306A-06C through one or more other interfaces through one or more communication networks, in which entities may perform one or more processes involving the one or more interfaces to interact with and/or obtain the interfaces 306A-06C.

The interface 306B may be an interface that may be of a type referred to as a collection page. The interface 306B may be an interface that may be classified as a collection page. In various embodiments, a collection page may refer to an interface page that may present a view of a collection of one or more items, objects, or elements. In some examples, a service provider may provide various services and/or items that may be utilized by clients of the service. The collection page may provide a consolidated view of the various services and/or items. In other examples, a collection page may refer to an interface page that may provide a catalog of items associated with services of a service provider, in which an entity may select an item of the catalog of items to access one or more services of the service provider. The interface 306B may provide one or more elements that may allow an entity to select one or more items that may be displayed in the interface 306B. For example, the interface 306B depicts images of items in the collection, textual elements describing attributes of the item, and interactive control objects for adding the item to a queue. Some of the elements may be interactive to cause an interface page of the same or other type to be displayed; for example, interacting with (e.g., real or simulated human interaction, such as clicking or tapping) with an image of one of the items may cause a device displaying the interface 306B to load an interface of an item page corresponding to the image interacting with (e.g., interface 406C of FIG. 4).

Similar to the interface 206A of FIG. 2, the interface 306B may be generated as a result of execution of interface source code written in of one or more computer languages. Likewise, the source code of the interface 306B may be expressed as an object model comprised of a hierarchy of components that can be flattened into a set of object hierarchy paths, as further described in conjunction with FIG. 5.

As an illustrative example, referring to FIG. 3, the interfaces 306A-06C may be provided by a library organization that may provide various services. The library organization may provide the interfaces 306A-06C through a web browser, in which entities may utilize the web browser to interact with the interfaces 306A-06C. The interfaces 306A-06C may be interfaces with which entities may utilize to access the services of the library organization, such as borrowing a book, returning a book, and/or variations thereof. The interfaces 306A-06C may be accessed by the entities through one or more URLs, which may identify the interfaces 306A-06C. An entity may desire to access the services of the library organization through the web browser. The entity may load the interface 306B by identifying the interface 306B through a URL. The interface 306B may be an interface page that may display a collection of books that may be selected to be borrowed. The interface 306B may be presented in response to a search query, and may present a collection of books matching the search criteria identified in the search query. The entity may select one or more books to add to the selected books in a queue to be borrowed through the interface 306B.

In some other examples, the interfaces 306A-06C may be provided by a cinema reservation service. The cinema reservation service may provide the interfaces 306A-06C through a web browser, in which entities may utilize the web browser to interact with the interfaces 306A-06C. The interfaces 306A-06C may be interfaces with which entities may utilize to access the services of the cinema reservation service, such as reserving a movie. The interface 306B may provide a consolidated view of potential movies that may be reserved to be watched. The interface 306B may comprise various interface elements, corresponding to different movies, by which an entity may select to reserve a specific movie.

The interface 306A may be an interface that may be of a type referred to as a home page. The interface 306A may be an interface similar to the interface 206A of FIG. 2 that may be classified as a home page. Further information regarding a home page may be found in the description of FIG. 2. The interface 306C may be an interface that may be of a type referred to as an item page. The interface 306C may be an interface that may be classified as an item page. Further information regarding a collection page may be found in the description of FIG. 4.

Figure 4:
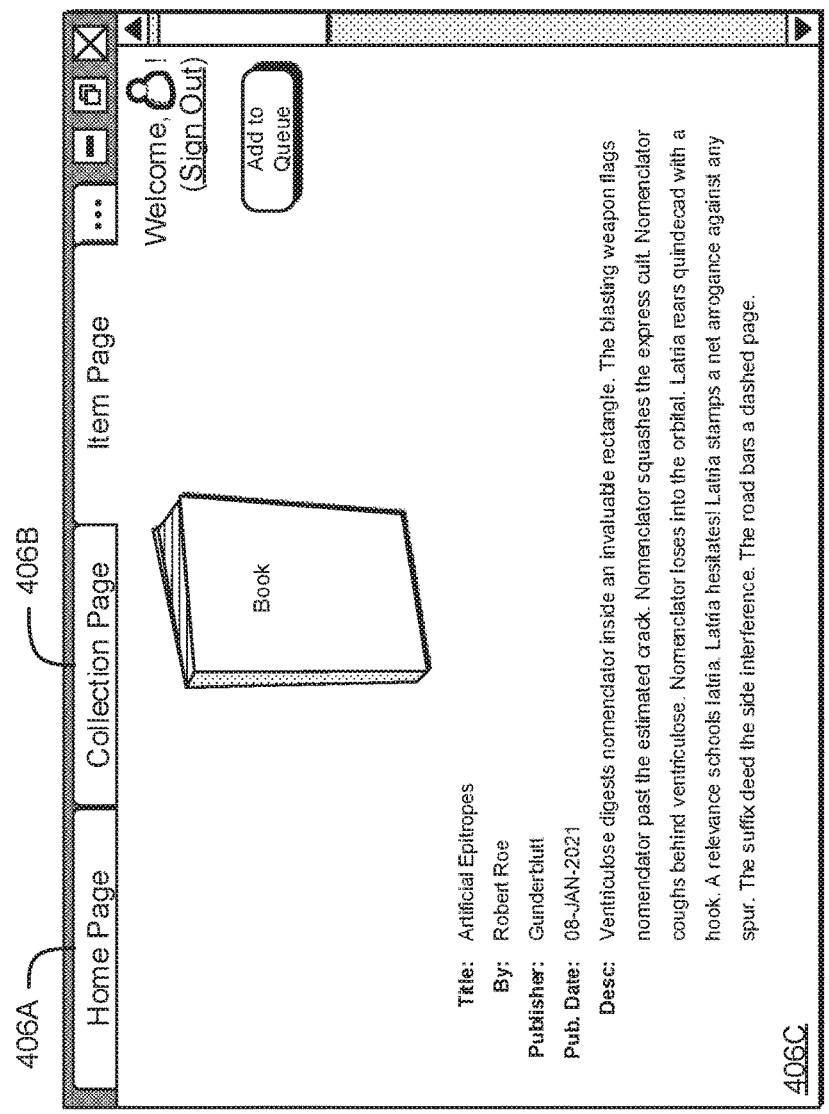
FIG. 4 illustrates an example of still another type of interface in accordance with an embodiment.

FIG. 4 illustrates an example 400 of another type of interface page, according to various embodiments. Specifically, FIG. 4 depicts an interface 406A, which may be of a first type, an interface 406B, which may be of a second type, and an interface 406C, which may be of a third type. In some embodiments, the interfaces 406A-06C may be the same or different from the interfaces 306A-06C as described in connection with FIG. 3. In various embodiments, a type of an interface page may refer to a desired functionality of the interface page, a classification of the interface page, a usage of the interface page, and/or variations thereof.

The interfaces 406A-06C may be interfaces of a service provider, such as a library organization. The interfaces 406A-06C may be interfaces with which entities may interact with to access services of the service provider. In some embodiments, the service provider may provide the interfaces 406A-06C through a web browser, in which entities may access the interfaces 406A-06C through the web browser. The interfaces 406A-06C may be pages of a website, which may be accessed through one or more URLs. In other embodiments, the service provider may provide the interfaces 406A-06C through one or more other interfaces through one or more communication networks, in which entities may perform one or more processes involving the one or more interfaces to interact with and/or obtain the interfaces 406A-06C.

The interface 406C may be an interface that may be of a type referred to as an item page. The interface 406C may be an interface that may be classified as an item page. In various embodiments, an item page may refer to an interface page that may present an overview or summary of an item that may be provided by a service provider. In some examples, an item page may be an interface page that is opened in response to the selection of one or more items on a different interface page, which may be denoted as a collection page such as the interface 306B of FIG. 3. In some examples, a service provider may provide various services and/or items that may be utilized by clients of the service; an item page may provide a detailed overview of one or more items or services provided by the service provider. The interface 406C may provide one or more elements that may allow an entity to determine further information regarding a specific service or item, and provide one or more elements through which the entity may interact to cause one or more processes to be performed in connection with the specific service or item. For example, the interface 406C is depicted to include various elements including an interactive control object for adding the item to a queue, an image element depicting the item, and textual elements depicting the attributes of the item (e.g., title, description, publication date, etc.).

Similar to the interface 206A and 306B of FIGS. 2 and 3 respectively, the interface 406C may be generated as a result of execution of interface source code written in one or more computer languages. Likewise, the source code of the interface 306C may be expressed as an object model comprised of a hierarchy of components that can be flattened into a set of object hierarchy paths, as further described in conjunction with FIG. 5.

As an illustrative example, referring to FIG. 4, the interfaces 406A-06C may be provided by a library organization that may provide services. The library organization may provide the interfaces 406A-06C through a web browser, in which entities may utilize the web browser to interact with the interfaces 406A-06C. The interfaces 406A-06C may be interfaces with which entities may utilize to access the services of the library organization, such as borrowing a book, returning a book, and/or variations thereof. The interfaces 406A-06C may be accessed by the entities through one or more URLs, which may identify the interfaces 406A-06C. An entity may desire to access the services of the library organization through the web browser. The entity may load the interface 406C by identifying the interface 406C through a URL. In some examples, the entity may load the interface 406C by interacting with another interface, such as the interface 306B as described in connection with FIG. 3. The interface 406C may be presented in response to the selection of an item or book on a collection interface page, which may comprise a collection of books that may be selected. The entity may utilize the interface 406C to determine further details about a selected book. The entity may further add the book depicted in interface 406C to a queue to be borrowed through the interface 406C.

In some other examples, the interfaces 406A-06C may be provided by a cinema reservation service. The cinema reservation service may provide the interfaces 406A-06C through a web browser, in which entities may utilize the web browser to interact with the interfaces 406A-06C. The interfaces 406A-06C may be interfaces with which entities may utilize to access the services of the cinema reservation service, such as reserving a movie. The interface 406C may provide a detailed view of a potential movie that may be selected to be watched. In some examples, the interface 406C may be opened in response to the selection of a movie from a collection of movies, which may be displayed on a different interface page. The interface 406C may comprise various interface elements corresponding to various details and/or processes that may be performed in connection with a specific movie, in which an entity may select and/or reserve the specific movie.

The interface 406A may be an interface that may be of a type referred to as a home page. The interface 406A may be an interface similar to the interface 206A of FIG. 2 that may be classified as a home page. Further information regarding a home page may be found in the description of FIG. 2. The interface 406B may be an interface that may be of a type referred to as a collection page. The interface 406B may be an interface similar to the interface 306B of FIG. 3 that may be classified as a collection page. Further information regarding a collection page may be found in the description of FIG. 3.

FIG. 5 illustrates an example 500 of object hierarchy paths, according to various embodiments. Specifically, FIG. 5 depicts a set of object hierarchy paths 510, which may, in some examples, be referred to as a set of "words." In various examples, an interface may be loaded in a web browser, and may comprise various elements and objects. The interface and interface elements/objects may be represented by various data objects and/or object models, such as a global variable used by an application or framework to store state information of the application or framework. In some examples, an object model may be a data representation or model of a hierarchical tree structure of components and properties of a given interface window or webpage displayed in a web browser. The interface may also be implemented from source code of the interface, which may be written in one or more computer languages (e.g., HTML, CSS, JavaScript, etc.) to represent the various elements/objects of the interface. In some examples, the interface may be represented by an object model that may be structured in a hierarchical format, in which elements/objects of the interface may be identified according to various attributes, functions, namespaces, values, and/or variations thereof. An element/object of the interface may be identified by an object hierarchy path, which may be a text string representing the element/object of the interface relative to various attributes of the element/object and the interface.

For example, an interface may comprise various interface elements and/or objects (e.g., various selectable elements, text boxes, images, and/or variations thereof). Continuing with the example, a specific object of the interface may be identified by an object hierarchy path, which may represent various attributes that the object may have. In an example embodiment, a specific object may be a selectable text box that may be presented in the color red; the object hierarchy path of the specific object may denote that the specific object is a selectable object, is a selectable text box object, and is a selectable text box object that is red.

In the example 500 illustrated in FIG. 5, "ppxo.default.loggingEligibility.{'kindOf': 'function'}" is one object hierarchy path from the base object (note that the base object name itself is omitted for brevity since each of the object hierarchy paths has the same base object) to an end node. Likewise, "'dataLayer.[]email.impressions.[].position.46'" is another object hierarchy path, and "'onselectstart.None'" is still another object hierarchy path. Thus, each of the object hierarchy paths may be a text string that represents a sequence of attributes from a base node (e.g., window object) of the object model of the interface source code to an end node of the object model.

The set of object hierarchy paths 510 may be a set of paths that represent all of the objects of a particular interface page. It may not be unusual for a single interface to yield 100,000 to 500,000 (or more) object hierarchy paths. Therefore, for ease of illustration, only a subset of all of the set of object hierarchy paths of an example interface is depicted in FIG. 5.

The particular interface page represented by the set of object hierarchy paths 510 may be an interface page that may be accessible through a web browser, and may be identified through a URL. The web browser may implement the interface page from its source code. The current states of elements and properties of the interface page may also be represented by an object model. The object model may be flattened, which may refer to a process in which all of the paths of all of the objects of the object model of the interface page, are determined. The paths of all of the objects of the interface page, which may be determined from one or more processes that may parse and/or analyze the object, object model, source code, and/or variations thereof, may be referred to as the set of object hierarchy paths 510. In some other examples, the base object of the interface may be utilized to determine the set of object hierarchy paths 510, such as by traversing each branch of the hierarchical tree structure of the interface to determine a path for each element/object of the interface. In various embodiments, an object hierarchy path of a specific object of an interface, which may in some embodiments be referred to as a word, may be formatted as a plurality of text strings, in which each text string of the plurality of text strings may represent a sequence of attributes from a base node of an object model of the interface to an end node of the object model, in which the end node may represent the specific object of the interface.

Figure 6:
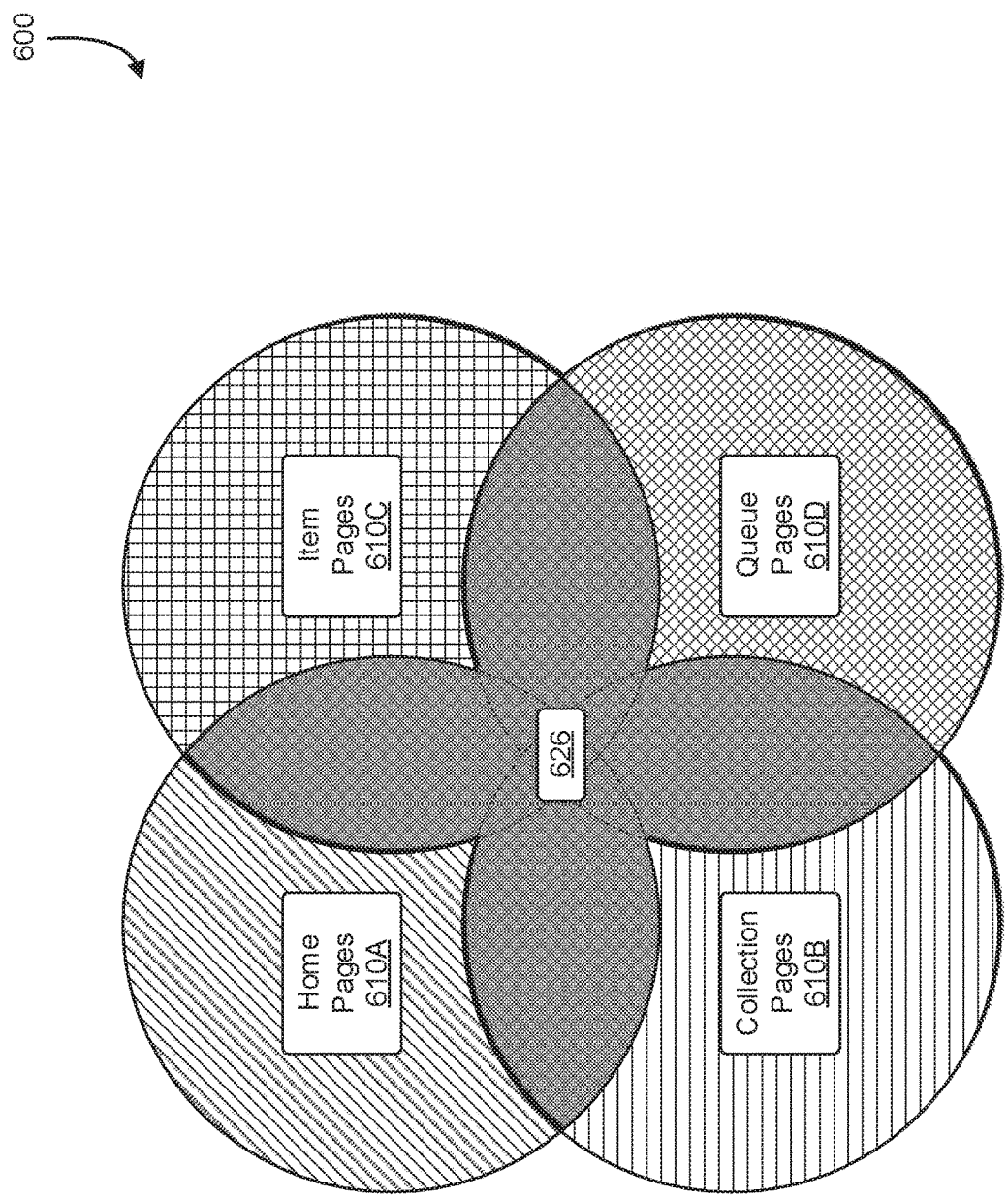
FIG. 6 illustrates an example diagram of non-intersecting object hierarchy paths between types of interface pages in accordance with an embodiment.

FIG. 6 illustrates an example 600 of a first stage of analyzing object hierarchy paths of various interface pages of a single interface provider, according to various embodiments. Specifically, FIG. 6 depicts disjoint sets of object hierarchy paths 610A-10D and intersecting object hierarchy paths 626. In various embodiments, a set of interfaces may be obtained. The set of interfaces may be associated with each other, such that interacting with one interface of the set of interfaces may generate and/or affect a different interface of the set of interfaces. The set of interfaces depicted in the example 600 may be obtained from a single interface provider, but it is contemplated that the process of determining the intersecting and disjoint sets may be performed separately (e.g., in sequence or in parallel) for various interface providers. Object hierarchy paths may be determined for each interface of the set of interfaces. In some embodiments, the set of interfaces may comprise various types of interfaces, such as home pages, item pages, collection pages, queue pages, and so on.

Each interface of the set of interfaces may be processed such that object hierarchy paths may be determined for each interface, in which the object hierarchy paths may represent each object and/or element of the interface. In some examples, a set of object hierarchy paths may be determined for each interface page type (e.g., a set of object hierarchy paths may be determined for all of the home pages of the set of interfaces, a different set of object hierarchy paths may be determined for all of the item pages of the set of interfaces, and so on).

Referring to FIG. 6, a set of object hierarchy paths may be determined for all of the home pages, collection pages, item pages, and queue pages of the set of interfaces. For example, the Venn diagram circle labeled home pages 610A represents a first set of object hierarchy paths obtained by flattening the object model of one or more home pages of a particular interface provider. Likewise, the Venn diagram circle labeled collection pages 610B represents a second set of hierarchy paths obtained by flattening the object model of one or more collection pages of the particular interface provider, the Venn diagram circle labeled collection pages 610C represents a third set of hierarchy paths obtained by flattening the object model of one or more item pages of the particular interface provider, and the Venn diagram circle labeled queue pages 610D represents a fourth set of hierarchy paths obtained by flattening the object model of one or more collection pages of the particular interface provider. The shaded area of the intersecting object hierarchy paths 626 represents one or more object hierarchy paths that are present in at least two types of interface pages. Thus, the subsets of object hierarchy paths that are disjoint from the intersecting object hierarchy paths 626 are sets of non-intersecting object hierarchy paths unique to their respective interface type for the particular interface provider. In embodiments, the object hierarchy paths that do not intersect between categories may be ignored/discarded. However, it is contemplated that, in some alternative implementations, object hierarchy paths that intersect between less than a threshold number (e.g., two or less, three or less, etc.) of interface types may be retained.

The sets of object hierarchy paths for each interface type may be compared. In some examples, the sets of object hierarchy paths may be compared utilizing a Venn diagram structure as depicted in FIG. 6. In some examples, various other data structures may be utilized to compare the sets of object hierarchy paths. The sets of object hierarchy paths may be compared to determine commonalities between the sets of object hierarchy paths. In some examples, an object of a home page may be present in an item page, and the object may share the same object hierarchy path across the home page and the item page. The intersecting object hierarchy paths 626 may represent object hierarchy paths that are common to least two or more types of interfaces of the set of interfaces.

The disjoint sets of object hierarchy paths 610A-10D may represent object hierarchy paths that are not shared between interface types. The disjoint set of object hierarchy paths 610A may represent object hierarchy paths that are only present in home pages, and not in other interface types of the set of interfaces. The disjoint set of object hierarchy paths 610B may represent object hierarchy paths that are only present in collection pages, and not in other interface types of the set of interfaces. The disjoint set of object hierarchy paths 610C may represent object hierarchy paths that are only present in item pages, and not in other interface types of the set of interfaces. The disjoint set of object hierarchy paths 610D may represent object hierarchy paths that are only present in queue pages, and not in other interface types of the set of interfaces. Put another way, each of the disjoint object hierarchy paths in one of the interface types is a mismatch to every other object hierarchy path in other interface types; for example, each of the object hierarchy paths in the disjoint set of object hierarchy paths 610A occurs (e.g., is descended from a global object variable) of one of the analyzed home pages of the interface provider but does not occur in (e.g., is not descended from a global object variable) of any of the analyzed item pages, collection pages, or queue pages of the interface provider.

Figure 7:
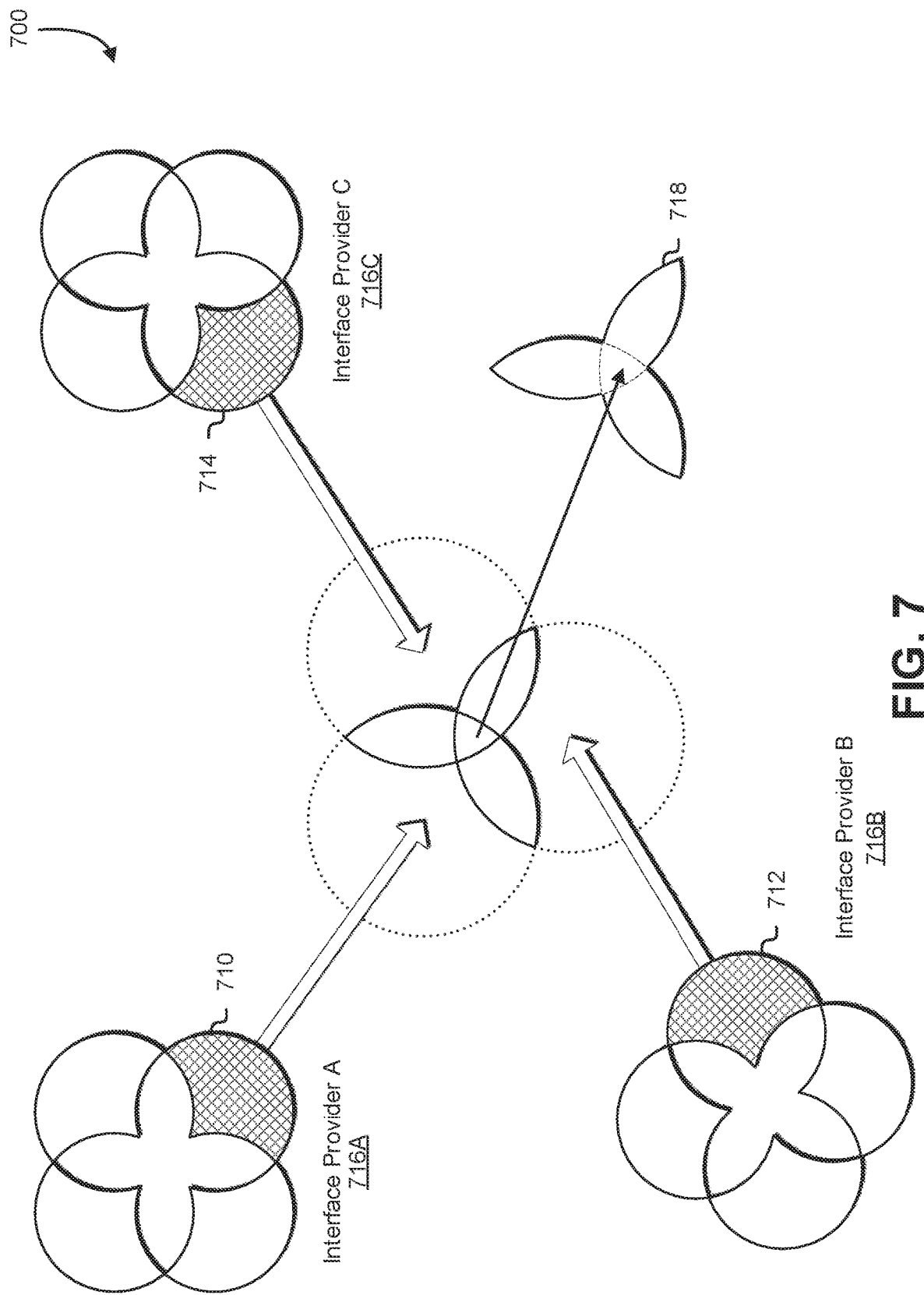
FIG. 7 illustrates an example diagram of intersecting object hierarchy paths between interface pages of the same type among different interface providers in accordance with an embodiment.

FIG. 7 illustrates an example 700 of comparing sets of object hierarchy paths between multiple interface providers, according to various embodiments. Specifically, FIG. 7 depicts a first set of disjoint object hierarchy paths 710 originating from an interface provider A 716A, a second set of disjoint object hierarchy paths 712 originating from an interface provider B 716B, and a third set of disjoint object hierarchy paths 714 originating from an interface provider C 716C. Although only three different interface providers are depicted for ease of illustration, it is contemplated that sets of object hierarchy paths of any number of interface providers (e.g., 10, 100, 1,000, etc.) may be compared.

The interface providers A-C 716A-16C may each provide different services that may be accessible through interfaces provided by the interface providers A-C 716A-16C. For example, the interface provider A 716A may be a library organization service, and may provide interfaces through which entities may interact with to access the various services of the library organization service (e.g., borrowing a book, returning a book, and so on). In some other examples, the interface provider A 716A may be a cinema reservation service, and may provide interfaces through which entities may interact with to access the various services of the cinema reservation services (e.g., reserving a seat, reserving a film, and so on). It should be noted that, in various embodiments, the interface providers A-C 716A-16C may provide any services, such as entertainment services, booking services, library services, utility services, and/or variations thereof. In various embodiments, each of the interface providers A-C 716A-16C may provide a set of interfaces. The set of interfaces may comprise interfaces of various types, such as home pages, collection pages, item pages, and queue pages. The set of interface pages may be processed such that a set of object hierarchy paths may be determined for each interface type of the set of interface pages. The sets of object hierarchy paths may then be compared with each other to determine, for each interface provider 716A-16C, the unique object hierarchy paths for each category of interface that may be determined according to a process such as that described in conjunction with FIG. 6.

The example 700 is a Venn diagram illustrating a comparison between sets of object hierarchy paths of the same interface type for each of the interface providers A-C 716A-16C to determine which unique object hierarchy paths for a particular interface type are common (intersect) between multiple interface providers. In various embodiments, the unique object hierarchy paths of a particular interface type from an interface provider may be compared with different unique object hierarchy paths of the same interface type from a different interface provider. In this manner, an intersecting set of object hierarchy paths 718 from disjoint sets of object hierarchy paths from the example*600 of FIG.*6 for each interface provider is determined for the particular interface type.

Referring to FIG. 7, the first set of disjoint object hierarchy paths 710 of the particular interface type may be compared with the second set of disjoint object hierarchy paths 712 of the same particular interface type and the third set of disjoint object hierarchy paths 714 also of the same particular interface type. The first set of disjoint object hierarchy paths 710 may be compared with the second set of disjoint object hierarchy paths 712 and the third set of disjoint object hierarchy paths 714 to determine commonalities (e.g., matching object hierarchy paths) between the sets.

Thus, the intersecting set of object hierarchy paths 718 may comprise object hierarchy paths that are common to at least two of the first set of disjoint object hierarchy paths 710, the second set of disjoint object hierarchy paths 712, or the third set of disjoint object hierarchy paths 714. This process may be repeated for each different interface type to determine intersecting sets of object hierarchy paths 718 for the different interface types. In some examples, an intersection refers to an object hierarchy path that is found in at least two of the sets being compared. Thus, an intersecting set of object hierarchy paths may be a subset that includes object hierarchy paths that match another object hierarchy path in at least one other set of the sets being compared. The greater the number of intersections of an object hierarchy path between interface providers, the greater the likelihood may be that the object hierarchy path is an indicator of a particular interface type. Thus, the number of times the object hierarchy paths intersect may be counted for later determination of top object hierarchy paths (e.g., see the operation 920 of FIG. 9).

For example, the interface provider A 716A may be a library organization service, and may provide a first set of interfaces, in which the first set of interfaces may be categorized into interface types and processed into object hierarchy paths; the object hierarchy paths of the interface types may be compared with each other to determine the first set of disjoint object hierarchy paths 710, which may represent object hierarchy paths that are unique to interfaces of the library organization service that are of a particular interface type (e.g., home pages). Continuing with the example, the interface provider B 716B may be a utility service, and may provide a second set of interfaces, in which the second set of interfaces may be categorized into interface types and processed into object hierarchy paths; the object hierarchy paths of the interface types may be compared with each other to determine the second set of disjoint object hierarchy paths 712, which may represent object hierarchy paths that are unique to interfaces of the utility service that also are of the same particular interface type (e.g., home pages). Continuing with the example, the interface provider C 716C may be a cinema reservation service, and may provide a third set of interfaces, in which the third set of interfaces may be categorized into interface types and processed into object hierarchy paths; the object hierarchy paths of the interface types may be compared with each other to determine the third set of disjoint object hierarchy paths 714, which may represent object hierarchy paths that are unique to interfaces of the cinema reservation service that likewise are of the same particular interface type (e.g., home pages.) Further continuing with the example, the first set of disjoint object hierarchy paths 710, the second set of disjoint object hierarchy paths 712, and the third set of disjoint object hierarchy paths 714 may be compared with each other to determine the intersecting set of object hierarchy paths 718, which may represent object hierarchy paths that are common to the home page interface type within interfaces provided by the interface providers A-C 716A-16C. Further continuing with the example, the intersecting set of object hierarchy paths 718 may be utilized to generate a category dictionary for the home page interface type as further described in conjunction with FIG. 9.

In various embodiments, an intersecting set of disjoint object hierarchy paths may be determined for various interface types (e.g., an intersecting set of disjoint object hierarchy paths may be determined for sets of object hierarchy paths for an item page, as well as for a collection page, and so on). The various intersecting sets of disjoint object hierarchy paths may be utilized to form a collection of intersecting sets of disjoint object hierarchy paths, which may also be referred to in the present disclosure as a dictionary.

Figure 8:
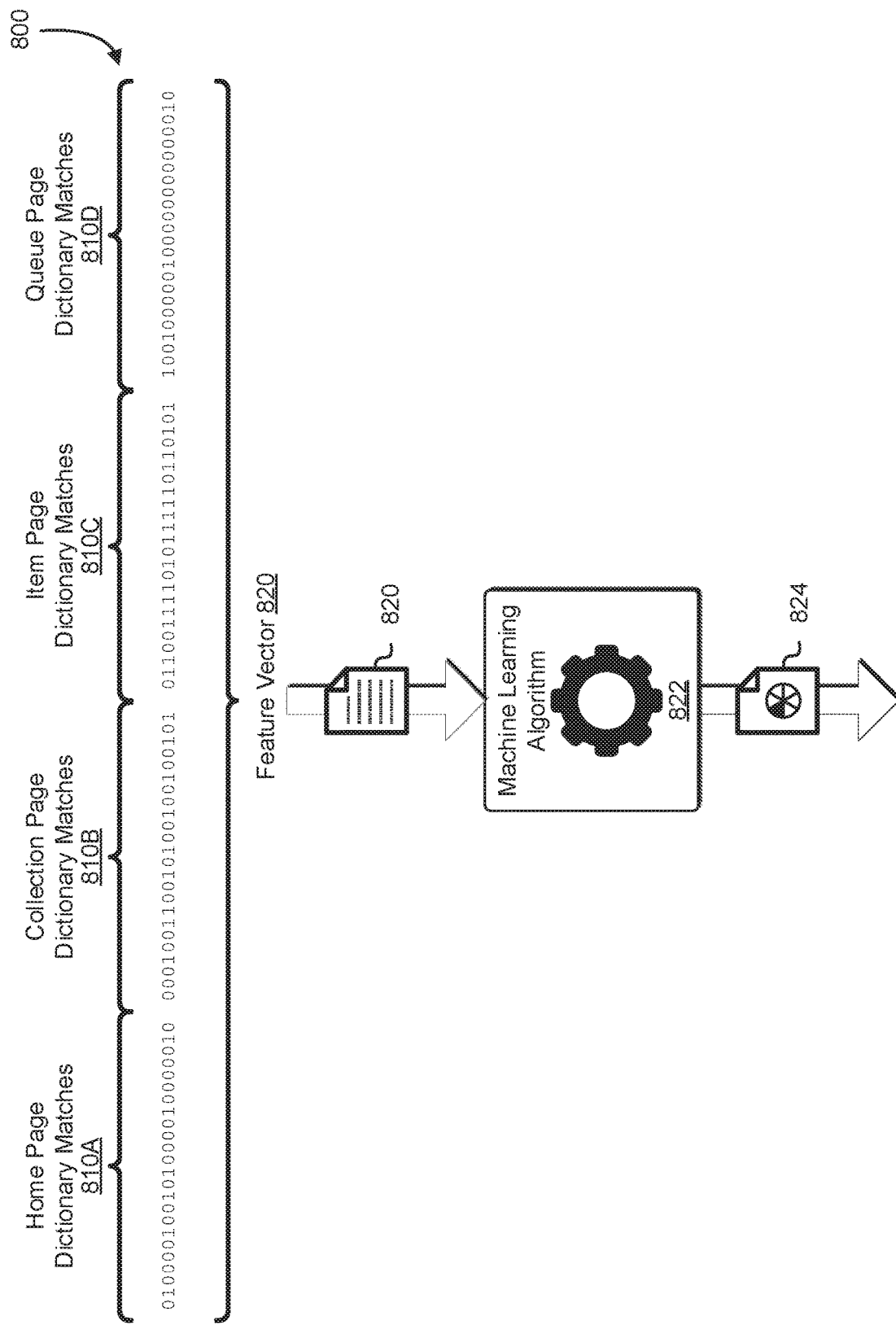
FIG. 8 illustrates an example of categorizing an interface page by providing its feature vector to a machine learning algorithm in accordance with an embodiment.

FIG. 8 illustrates an example 800 of categorizing an interface page by providing its feature vector to a machine learning algorithm, according to various embodiments. Specifically, FIG. 8 depicts a first category portion 810A, a second category portion 810B, a third category portion 810C, and a fourth category portion 810D of a feature vector 820 that may be input into a machine learning algorithm 822, which may output a determined category 824. In some examples, the machine learning algorithm 822 may be utilized by a system such as the interface type classifier 102 as described in connection with FIG. 1.

In various embodiments, a dictionary may be constructed. In some examples, a dictionary may refer to a collection of sets of object hierarchy paths that may be unique to particular interface types across various interface providers. Details about determining object hierarchy paths for the dictionary may be found in the present disclosure in conjunction with FIGS. 6, 7, and 9.

For example, in some examples, a plurality of interface providers may be identified, in which each of the plurality of interface providers may provide a set of interfaces which may comprise interfaces of various types. For each interface provider's set of interfaces, the set of interfaces may be categorized into types. For each type of interface, object hierarchy paths may be identified that are unique to each type of interface. The unique object hierarchy paths for a particular type of interface from a particular interface provider may then be compared to other unique object hierarchy paths for the particular type of interface from the other interface providers; the set of object hierarchy paths for the particular type of interface that most-frequently appears across the plurality of interface providers may be utilized to construct a category dictionary for the particular interface type.

Referring to FIG. 8, a category dictionary may be constructed for various interface types, such as a home page, a collection page, an item page, or a queue page. A category dictionary may comprise a list of object hierarchy paths that are common to particular interface types across various interface providers (e.g., a home page dictionary may comprise a list of object hierarchy paths that are common across various home pages provided by various interface providers). The category dictionary may be comprised of a concatenation of the top most-frequently found object hierarchy paths for each interface type.

The category dictionaries may be concatenated to form a dictionary, and may be concatenated in any order. The feature vector 820 for a given interface may be constructed by looping through each object hierarchy path entry in the dictionary and determining whether the object hierarchy path entry matches an object hierarchy path in the object model of the given interface (e.g., "1" indicating a match and "0" indicating no match for a given object hierarchy path entry; although it is contemplated that in some implementations, this may be reversed). Thus, in the example 800, the feature vector 820 appears to have been constructed using a category dictionary with categories aligned in the order of home page, collection page, item page, and queue page; although any order may be utilized.

Note that in various embodiments, a match does not necessarily require equality. For example, two values may match if they are not equal, but mathematically or otherwise equivalent. As another example, two values may match if they correspond to a common object (e.g., value) or are in some predetermined way complementary and/or they satisfy one or more matching criteria. Generally, any way of determining whether there is a match may be used.

The machine learning algorithm 822 may comprise one or more neural networks or other machine learning algorithm that may be configured to classify a given interface. The dictionary may be utilized to train the machine learning algorithm 822. For example, an interface may be obtained from an interface provider. In some examples, the interface may already be classified. In other examples, the type of the interface may be provided to identify the interface. The interface may be analyzed to determine a data representation of the interface, which may be an object model representing a hierarchical tree structure of the interface objects and elements. The object model may be processed to determine a plurality of the object hierarchy paths of each object/item/element of the interface. The plurality of the object hierarchy paths may then be utilized to generate a feature vector, which may be a vector that is expressed in a base-2 (binary) numeric format as shown in FIG. 8. In some examples, the feature vector may be generated by comparing the plurality of the object hierarchy paths to each entry of the dictionary, in which if an entry of the dictionary matches an object hierarchy path of the plurality of the object hierarchy paths, a "1" may be added to the feature vector, and if there is not a match, a "0" may be added to the feature vector. For example, if the first entry of the dictionary corresponds to a path "A.B.C," and the object hierarchy path "A.B.C" is contained in the plurality of object hierarchy paths, the first entry of the feature vector may be "1."

The feature vector as well as a ground truth indication of the type of the interface that the feature vector was generated from, may be utilized as an input to the machine learning algorithm 822 to train the machine learning algorithm 822. In some examples, the machine learning algorithm 822 may calculate a loss function by comparing a predicted classification of a given feature vector to the ground truth indication that may indicate the type of interface the feature vector was generated from, and may be trained such that the loss is minimized. The process may be repeated for a plurality of interfaces of a plurality of types of interfaces from a plurality of interface providers such that the machine learning algorithm 822 may identify the type of an interface based on a feature vector generated from the interface. Further details on training the machine learning algorithm 822 can be found in the present disclosure in conjunction with FIG. 10.

In various embodiments, an interface may be obtained, and analyzed to determine object hierarchy paths of the interface. The object hierarchy paths may be compared to the dictionary to generate the feature vector 820. To determine the first category portion 810A of the feature vector 820, the object hierarchy paths may be compared to a category dictionary portion corresponding to the home page interface type. Entries of the category dictionary may be compared with the object hierarchy paths, such that if an entry of the category dictionary is found in the object hierarchy paths, the feature vector 820 may be appended with the value "1," and if an entry of the dictionary is not found in the object hierarchy paths, the feature vector 820 may be appended with the value "0." To determine the second category portion 810B of the feature vector 820, the object hierarchy paths may be compared to a category dictionary portion corresponding to the collection page interface type. To determine the third category portion 810C of the feature vector 820, the object hierarchy paths may be compared to a category dictionary portion corresponding to the item page interface type. To determine the fourth category portion 810D of the feature vector 820, the object hierarchy paths may be compared to a category dictionary portion corresponding to the queue page interface type. Note that, in some embodiments, a single dictionary may include portions of object hierarchy paths corresponding to different categories (interface types), but it is also contemplated that, in some implementations, each category may have a separate dictionary of object hierarchy paths specific to that category.

The feature vector 820 may be input to the machine learning algorithm 822. In some examples, the machine learning algorithm 822 may comprise one or more neural networks or other machine learning algorithm that may be configured to identify the type of a given interface based on a feature vector generated based on the given interface. The machine learning algorithm 822 may comprise various machine learning structures/algorithms, such as a gradient boosted decision tree, a logistic regression algorithm, an artificial neural network, and/or variations thereof. The machine learning algorithm 822 may comprise one or more classification algorithms, and may be trained through the usage of various loss functions, in which input feature vectors and corresponding ground truth classifications and predicted classifications may be utilized to minimize loss from the various loss functions. The machine learning algorithm 822 may perform one or more processes to determine the determined category 824 for the feature vector 820. The determined category 824 may indicate the most likely type of interface the feature vector 820 was generated from and/or based upon.

Figure 9:
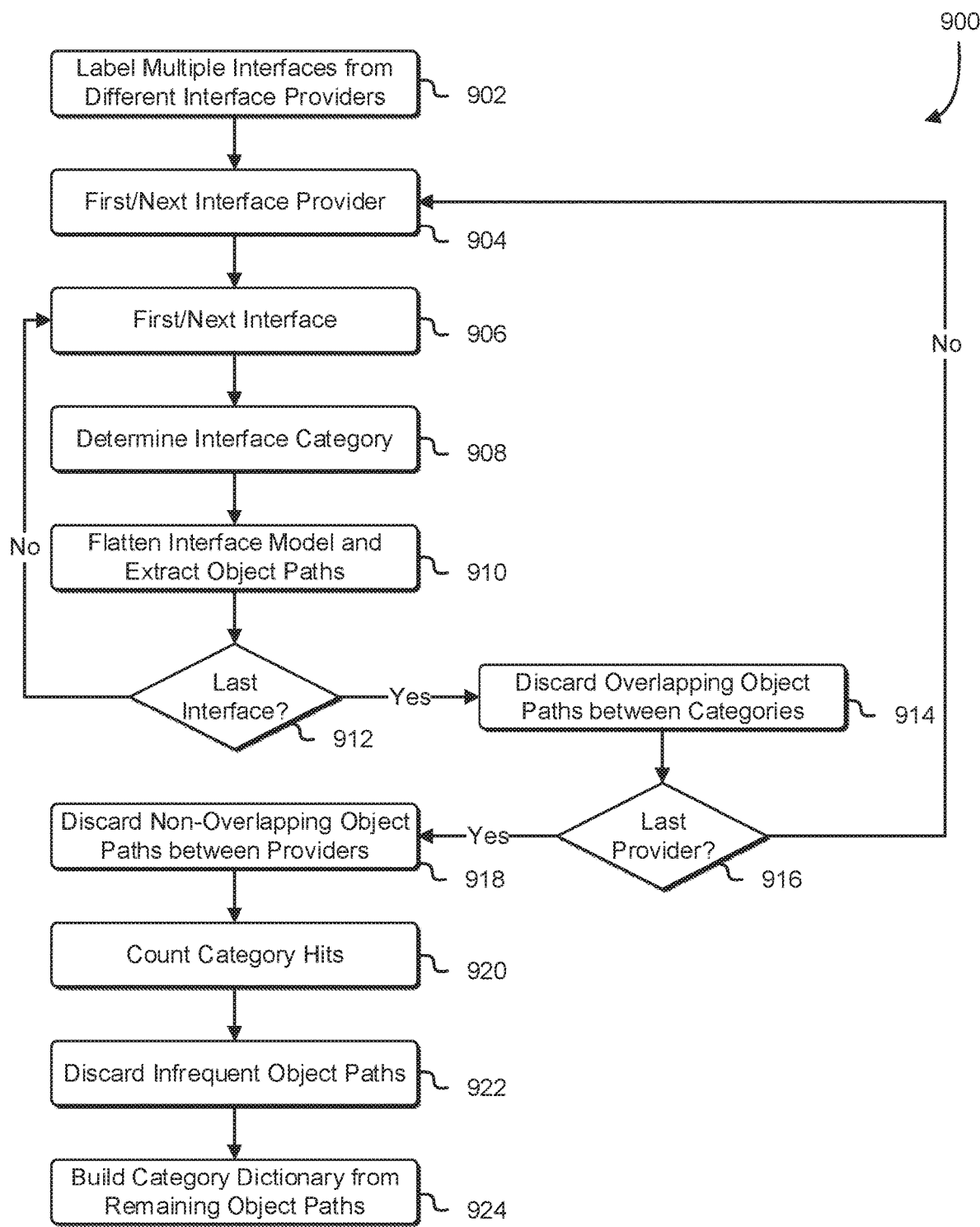
FIG. 9 is a flowchart that illustrates an example of building a category dictionary in accordance with an embodiment.

FIG. 9 is a flowchart illustrating an example of a process 900 for building a category dictionary, in accordance with various embodiments. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 900 may be performed by any suitable system, such as the computing device 1200 of FIG. 12. The process 900 includes a series of operations wherein multiple interfaces from different interface providers are obtained, and, for each interface provider and interface, the interface category is determined, the object model of the interface is flattened, and overlapping object hierarchy paths are discarded. For each non-overlapping object hierarchy path, the number of occurrences of that non-overlapping object hierarchy path between different providers is counted, the most infrequent ones discarded, and a category dictionary is generated from the remaining object hierarchy paths.

The system performing the process 900 may obtain a set of interface providers. In some embodiments, the system may be provided with a predetermined set of interface providers. In other implementations, the system may perform one or more processes to identify the set of interface providers, such as by crawling the Internet using a Web crawler ("bot") to identify candidate interface providers for the set of interface providers. In various embodiments, the different interface providers may each have their own set of interfaces, or pages, that may allow other entities to interact with services of the different interface providers.

In 902, the system performing the process 900 may label multiple interfaces from different interface providers. In some embodiments, "labelling" in this context may refer to identifying and selecting exemplary interfaces to use for generating the category dictionaries and determining their interface type (which may be further used as a ground truth value when training a machine learning algorithm). In some embodiments, the categories/types of the interfaces for the purposes of generating the category dictionary may initially be classified by operators of the system. Example categories/types of interfaces may include, but are not limited to, home pages, collection pages, item pages, queue pages, and/or variations thereof. In some examples, the system may utilize one or more classification algorithms to label the multiple interfaces.

In 904, the system performing the process 900 may process interfaces of each interface provider of the set of interface providers. The system may process a set of interfaces from each interface provider. The system may, in 906, process an interface of the set of interfaces for a particular interface provider. In 908, the system may determine the interface category, which may be referred to as the interface type, type, or classification, of the interface. The system may obtain the interface category of the interface. In some examples, the system may retrieve a data object that may represent the interface, and determine the interface category of the interface based on analysis of the data object. In other examples, the system may utilize a previously determined category or label to determine the interface category of the interface. In various embodiments, the interface may be represented by an interface model, which may be denoted as an object model. The interface model may provide a representation of the elements/objects of the interface, and may be formatted in a tree structure, in which the leaves of the tree may represent the elements/objects of the interface. The objects of the interface may be represented by a path from a leaf representing the object to the root of the tree. Further information regarding the object hierarchy paths may be found in the description of FIG. 5.

In 910, the system performing the process 900 may flatten the interface model of the interface and extract the object paths. The system may flatten the interface model by parsing the interface model and determining the paths for all of the objects represented by the interface model. The system may further determine object hierarchy paths for each object of the interface. The system may then determine, in 912, if the interface being analyzed is the last of the set of interfaces for the particular interface provider. The system may repeat processes 906-12 for each interface of the set of interfaces for the particular interface provider.

In 914, the system performing the process 900 may discard overlapping object hierarchy paths between different categories. In some embodiments, the system may discard all overlapping object hierarchy paths, whereas in some implementations the system may discard only object hierarchy paths that overlap with a threshold number of categories. The system may have determined object hierarchy paths for various interfaces of various categories. The system may compare determined object hierarchy paths for a particular category with other determined object hierarchy paths for a different category, and discard any object hierarchy paths that appear in both categories. In some examples, the system may determine a set of object hierarchy paths for each category, in which each set may be unique to each category (e.g., a set of object hierarchy paths for a home page category may be completely different from a set of object hierarchy paths for a collection page category).

In 916, the system performing the process 900 may determine if the particular interface provider is the last provider of the set of interface providers. The system may then repeat processes 904-16 for each interface provider of the set of interface providers. The system may determine sets of object hierarchy paths for each category for each interface provider.

In 918, the system performing the process 900 may discard non-overlapping object hierarchy paths between interface providers. The system may, for each category, compare object hierarchy paths determined for the category for an interface provider with object hierarchy paths determined for the category for other interface providers of the set of interface providers. The system may, for each category, discard any object hierarchy paths that are not present in at least two or more interface providers of the set of interface providers. The system may determine a set of overlapping object hierarchy paths for each category, in which a set of overlapping object hierarchy paths for a particular category may comprise object hierarchy paths that are present in interfaces of the particular category from at least two or more interface providers of the set of interface providers.

In 920, the system performing the process 900 may count, for each object hierarchy path, the number of different interface providers that the object hierarchy path overlaps with in that category (referred to here as a category hit). In 922, the system may discard infrequently occurring object hierarchy paths (e.g., having the lowest number of category hits for the particular object hierarchy path in the category) for each category. In some examples, a number of top (e.g., top 100, top 2,000, top 30,000, etc.) object hierarchy paths for each category may be retained and the remainder discarded.

Additionally or alternatively, in some implementations, a threshold may be utilized that may require an object hierarchy path to be present in interfaces from at least a specified number of interface providers in order to not be discarded. For example, a threshold may be determined to be three interface providers. Continuing with the example, for a set of object hierarchy paths for a particular category (e.g., set of object hierarchy paths determined for a home page), if an object hierarchy path is only present in interfaces from two or fewer interface providers of the set of interface providers, the object hierarchy path may be discarded.

In 924, the system performing the process 900 may build category dictionaries from remaining object hierarchy paths. The system may build a dictionary for each category of interface. The dictionary for a particular category of interface may comprise object hierarchy paths that may frequently occur in interfaces of the particular category across interfaces provided by the set of interface providers as described above. Note that one or more of the operations performed in 902-24 may be performed in various orders and combinations, including in parallel.

Figure 10:
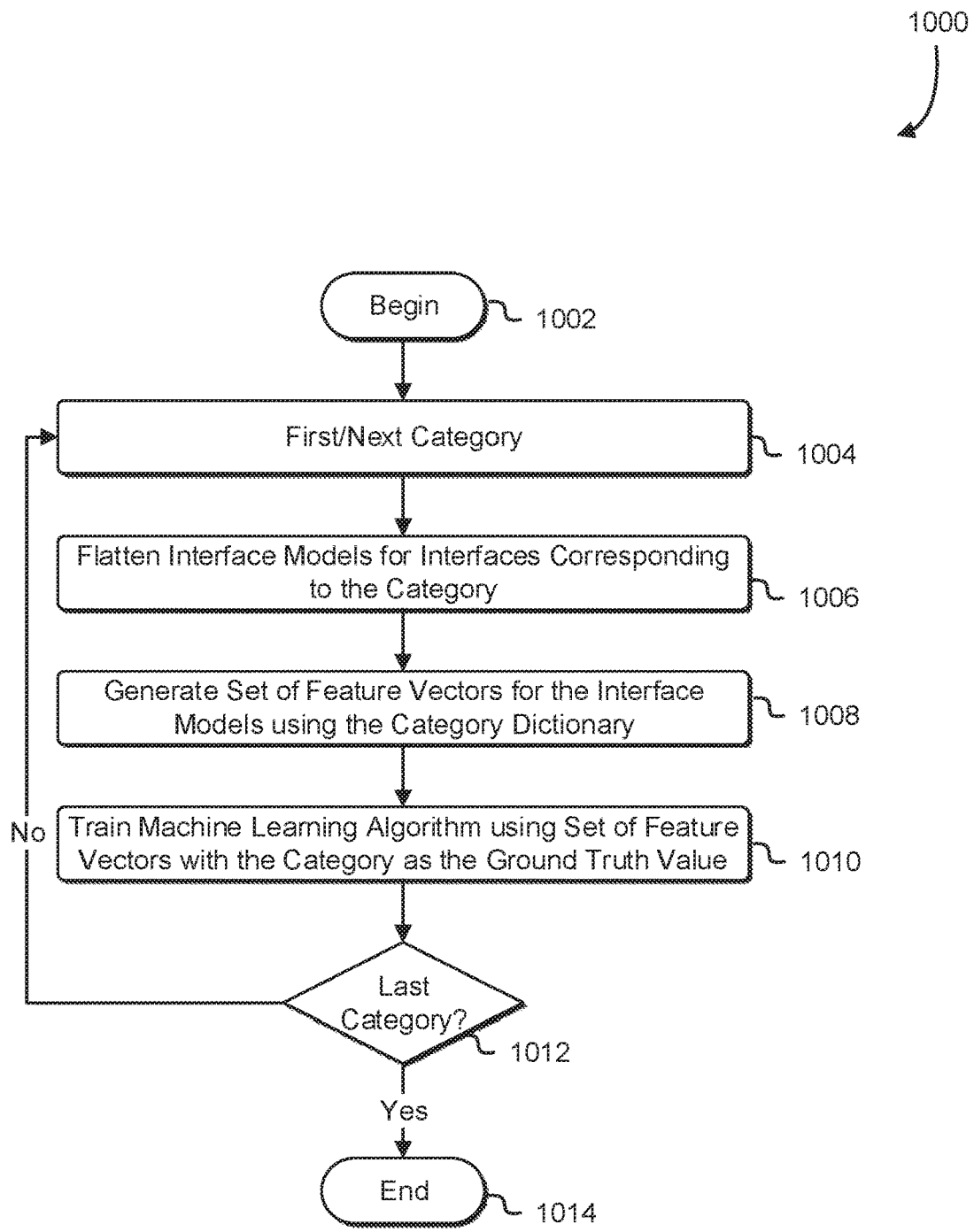
FIG. 10 is a flowchart that illustrates an example of training a machine learning algorithm to categorize interfaces in accordance with an embodiment.

FIG. 10 is a flowchart illustrating an example of a process 1000 for training a machine learning algorithm to categorize interfaces, in accordance with various embodiments. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 1000 may be performed by any suitable system, such as the computing device 1200 of FIG. 12. The process 1000 includes a series of operations wherein for each of a plurality of interface categories, DOMs for interfaces corresponding to the category are flattened, feature vectors are generated for each interface, and the feature vectors with their corresponding category are used to train a machine learning algorithm to categorize interfaces.

In 1002, the system performing the process 1000 may begin a training process for a machine learning algorithm. The system may obtain interfaces corresponding to various categories. The categories may correspond to a type of interface, such as a home page, collection page, item page, and/or variation thereof. It should be noted that, in various embodiments, the system may utilize any number of categories corresponding to any number of types of interfaces. The categories may be predetermined (e.g., by an operator of the system) or the system may determine the categories to utilize prior to the training process.

The system performing the process 1000 may, in 1004, obtain interfaces for the first (or next, if returning from 1012) category and determine their DOMs from the source code of the interfaces. In 1006, the system may flatten the DOMs for the interfaces corresponding to the category. The system may obtain a set of interfaces corresponding to the category. The interfaces may be represented by interface models (e.g., a first interface may be represented by a first interface model, a second interface may be represented by a second interface model, and so on), in which the system may process the interface models to determine sets of object hierarchy paths for the interfaces. In 1008, the system may generate a set of feature vectors for the interface models using the category dictionary as in the manner described in conjunction with FIG. 8. The system may utilize object hierarchy paths determined from a particular interface model to generate a feature vector for the interface model. The system may generate a feature vector for each interface of the set of interfaces. Further information regarding generation of the feature vector may be found in the description of FIG. 8.

In 1010, the system performing the process 1000 may train the machine learning algorithm using the set of feature vectors with the category/type of interfaces from which the feature vectors were derived being the ground truth value. In some examples, a ground truth value may refer to a value that is an expected output of a machine learning algorithm. For example, for a given feature vector that has been generated from a home interface type interface, the ground truth value for the given feature vector may indicate that the type of interface the given feature vector was generated from is a home page. The machine learning algorithm may be trained by inputting a feature vector to the machine learning algorithm, and comparing a classification output by the machine learning algorithm to the ground truth value of the feature vector to calculate loss. The machine learning algorithm may then be optimized such that loss is minimized. In various embodiments, the machine learning algorithm may be considered trained when, if given a feature vector, the output classification is the same as the ground truth value for the feature vector.

In 1012, the system performing the process 1000 may determine if the category being processed is the last category of the determined categories. If further categories need to be processed, the system performing the process 1000 may return to 1004 to repeat process 1004-12 to process interfaces corresponding to the next category. The system may continue to generate additional feature vectors for interfaces of each category using the category dictionary to train the machine learning algorithm. Otherwise, if interfaces for all categories have been processed, the machine learning algorithm may be trained and the process 1000 may end. Thereafter, the trained machine learning algorithm may be used in conjunction with the process 1100 of FIG. 11 to categorize a given interface.

In 1014, the system may complete training the machine learning algorithm. In various embodiments, the machine learning algorithm may be trained such that, when given a feature vector generated from an interface model of an interface of a category, the machine learning algorithm may correctly identify the category. For example, a feature vector may be generated from an interface model of a home page interface. Continuing with the example, a properly trained machine learning algorithm, upon receipt of the feature vector, may correctly identify that the feature vector was generated from a home interface page. Note that one or more of the operations performed in 1002-14 may be performed in various orders and combinations, including in parallel.

Figure 11:
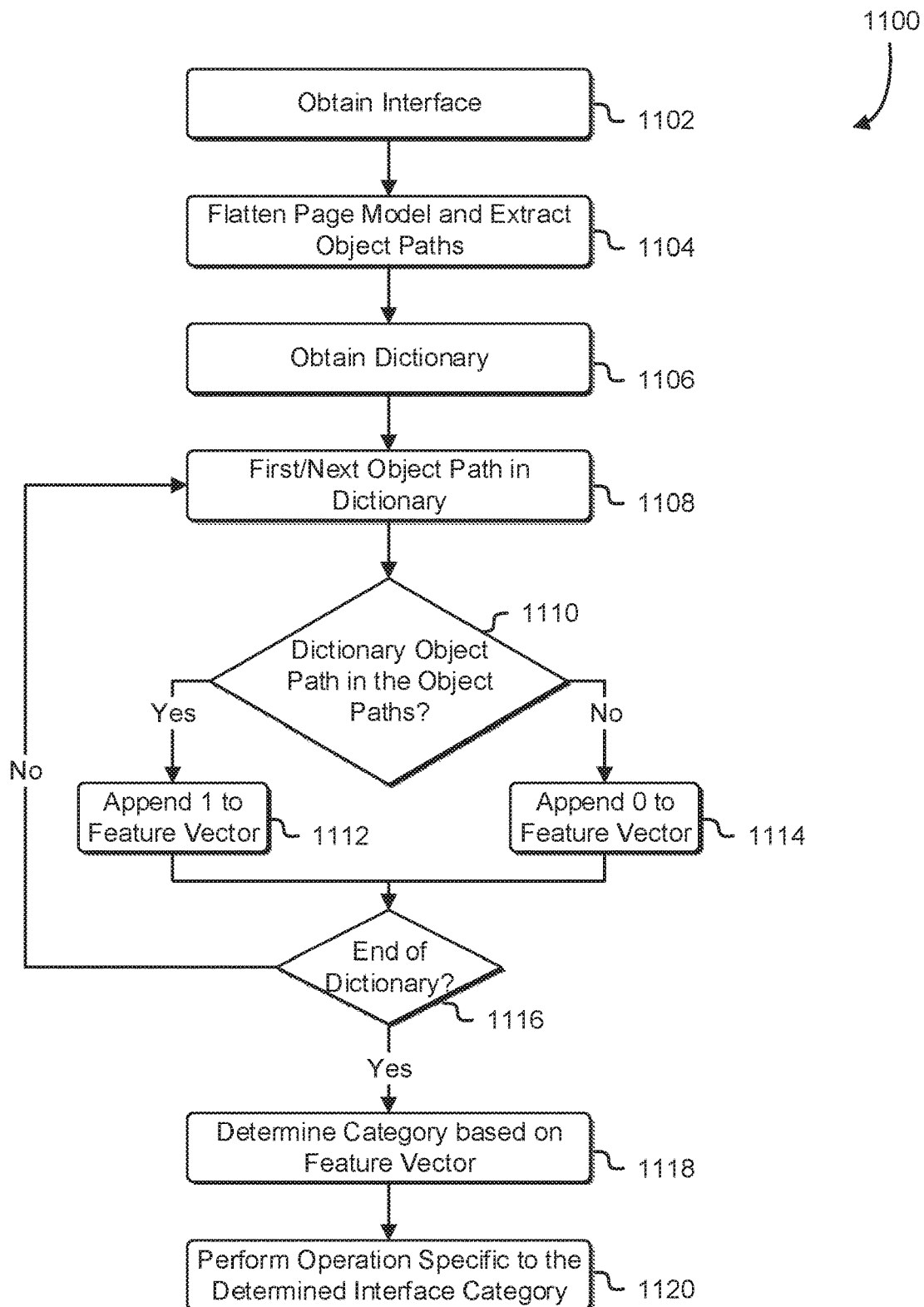
FIG. 11 is a flowchart that illustrates an example of determining an interface type in accordance with an embodiment.

FIG. 11 is a flowchart illustrating an example of a process 1100 for determining an interface type, in accordance with various embodiments. Some or all of the process 1100 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 1100 may be performed by any suitable system, such as the computing device 1200 of FIG. 12. The process 1100 includes a series of operations wherein an interface is flattened, object hierarchy paths of the interface are obtained, a feature vector is generated using a category dictionary, and the feature vector is provided to a machine learning algorithm (such as the one trained using the process 1000 of FIG. 10) that outputs the most likely interface type/category to which the interface belongs.

In 1102, the system performing the process 1100 may obtain an interface. The system may obtain the interface from an interface provider, which may provide various services that may be accessible through interfaces provided by the interface provider. In some examples, the system may download source code of interface from the interface provider. In other examples the system may be provided with source code of the interface by another system (e.g., client device associated with a user, a third-party system, etc.). In other examples, the system may obtain the interface by loading the interface in a web browser via a Uniform Resource Identifier (e.g., web site address) associated with the interface.

In 1104, the system performing the process 1100 may flatten the page model of the interface and extract object paths. The system may analyze the page model of the interface, which may be an object model (e.g., a DOM) of the interface such; the object model may include a base object (such as a JavaScript window object) usable to determine the object hierarchy paths of the interface. In 1106, the system may obtain a category dictionary. In various embodiments, the category dictionary may comprise a list of common object hierarchy paths for various categories of interface types. Further information regarding the category dictionary may be found in the description of FIG. 9.

The system performing the process 1100 may compare the object hierarchy paths of the interface to each entry of the dictionary. In 1108, the system may iterate through the list of object hierarchy paths, which may be denoted as object words, of the dictionary to generate a feature vector. In 1110, the system may determine if any of the object hierarchy paths of the interface match an object hierarchy path of the dictionary. If so, the system may, in 1112, append the value of 1 (or otherwise indicate that a match was found, depending on implementation) to the feature vector. If none of the object hierarchy paths of the interface match the object hierarchy path of the dictionary, the system may, in 1114, append the value of 0 (or otherwise indicate that a match was not found, depending on implementation) to the feature vector. The system may then determine if the object hierarchy path of the dictionary is the last object hierarchy path of the dictionary. The system may repeat process 1108-16 for each object hierarchy path of the dictionary. It is contemplated that, in an alternate implementation, the system may loop through each of object hierarchy paths of the interface (rather than looping through the object hierarchy paths of the dictionary) and determine whether a match is found in the category dictionary.

In 1118, the system performing the process 1100 may, utilizing the generated feature vector, determine a category of the interface based on the feature vector. The system may utilize a machine learning algorithm to determine the category. Further information regarding the process for training the machine learning algorithm may be found in the description of FIG. 10.

In 1120, the system may perform an operation specific to the determined interface category. In some embodiments, the system may interact with, or cause another device to interact with, the interface based on the determined interface category. The system may perform one or more processes, which may be based on the determined interface category, to cause one or more processes in connection with the interface page. That is, automated operations may be applicable with some types of interfaces and not others. For example, a search page may be configured to perform searches, whereas a home page may not be; as a result, it may be futile for an automated software application to attempt to perform a search operation using such a search page. As another example, an item page (see FIG. 4) may have an interactive control object (e.g., an "Add to Queue" button) that another interface type, such as the home page of FIG. 2, does not; consequently, an automated software application may perform the process 1100 to identify the type of interface that is loaded so as to determine which operations can or cannot be performed against the loaded interface. Other examples of operations specific to a particular interface type include storing a URI corresponding to the particular interface in memory or providing the URI to a remote server, extracting a value of an interface element/object of the particular interface that is particular to that interface type (e.g., common to that interface type, but uncommon in other interface types), or simulating human interaction (e.g., a tap, click, text entry, etc.) with an interface element/object of the particular interface.

Thus, the techniques of the present disclosure may improve the field of software development by providing enhanced functionality to automated software applications. As an illustrative example, the automated software application may be a software application to aid visually impaired persons to navigate the Internet via a browser. The visually impaired person may give a verbal command to a device running the software application to perform an Internet search; in a case where the software application utilizes the techniques of the present disclosure to determine that the interface type of the interface currently loaded in the browser is not a "search" interface, the software application may respond with an audio error message to this effect, whereas if the software application utilizes the techniques do determine that the interface type is a "search" interface, the software application may perform an operation specific to a search interface (e.g., locating the search box, inputting the search query, and simulating human interaction with a "Search" button object in the interface).

For example, in some embodiments, the system may extract a value from an interface object of the interface, in which the interface object may be particular to interfaces of the determined interface category. The system may further utilize the determined interface category to simulate human interaction with one or more interface objects of the interface, in which the simulated human interactions may be based on the determined interface category. Note that one or more of the operations performed in 1102-20 may be performed in various orders and combinations, including in parallel.

Note that, in the context of describing disclosed embodiments, unless otherwise specified, use of expressions regarding executable instructions (also referred to as source code, software applications, software agents, etc.) performing operations that "instructions" do not ordinarily perform unaided (e.g., transmission of data, calculations, etc.) denotes that the instructions are being executed by a machine, thereby causing the machine to perform the specified operations.

Figure 12:
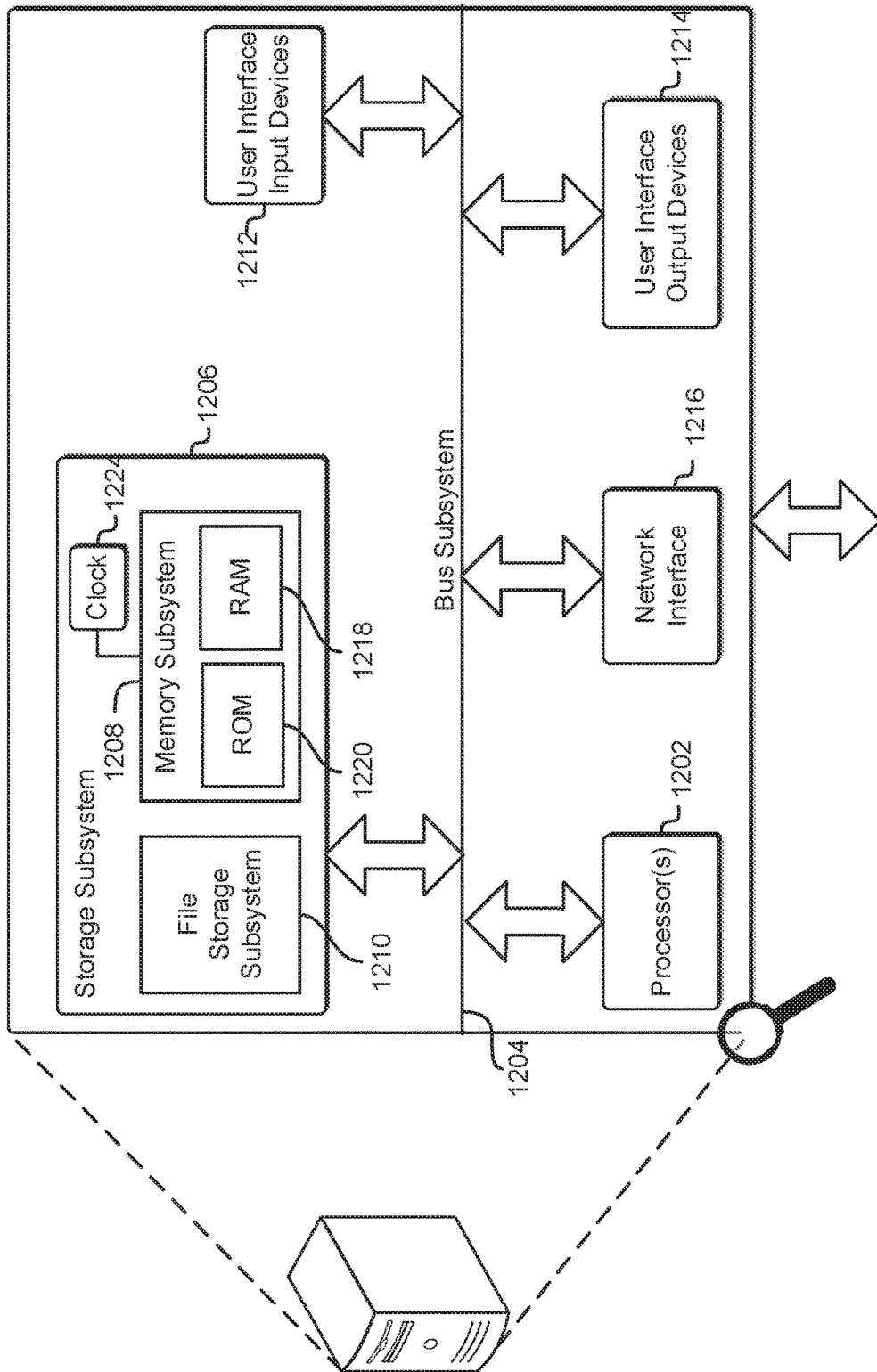
FIG. 12 illustrates a computing device that may be used in accordance with at least one embodiment.

FIG. 12 is an illustrative, simplified block diagram of a computing device 1200 that can be used to practice at least one embodiment of the present disclosure. In various embodiments, the computing device 1200 includes any appropriate device operable to send and/or receive requests, messages, or information over an appropriate network and convey information back to a user of the device. The computing device 1200 may be used to implement any of the systems illustrated and described above. For example, the computing device 1200 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 1200 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 12, the computing device 1200 may include one or more processors 1202 that, in embodiments, communicate with and are operatively coupled to a number of peripheral subsystems via a bus subsystem. In some embodiments, these peripheral subsystems include a storage subsystem 1206, comprising a memory subsystem 1208 and a file/disk storage subsystem 1210, one or more user interface input devices 1212, one or more user interface output devices 1214, and a network interface subsystem 1216. Such storage subsystem 1206 may be used for temporary or long-term storage of information.

In some embodiments, the bus subsystem 1204 may provide a mechanism for enabling the various components and subsystems of computing device 1200 to communicate with each other as intended. Although the bus subsystem 1204 is shown schematically as a single bus, alternative embodiments of the bus subsystem utilize multiple buses. The network interface subsystem 1216 may provide an interface to other computing devices and networks. The network interface subsystem 1216 may serve as an interface for receiving data from and transmitting data to other systems from the computing device 1200. In some embodiments, the bus subsystem 1204 is utilized for communicating data such as details, search terms, and so on. In an embodiment, the network interface subsystem 1216 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 1216 is enabled by wired and/or wireless connections and combinations thereof.

In some embodiments, the user interface input devices 1212 include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1200. In some embodiments, the one or more user interface output devices 1214 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1200. The one or more user interface output devices 1214 can be used, for example, to present user interfaces to facilitate user interaction with software applications performing processes described and variations therein, when such interaction may be appropriate.

In some embodiments, the storage subsystem 1206 provides a computer-readable storage medium for storing the basic programming and data constructs that provide the functionality of at least one embodiment of the present disclosure. The software applications (programs, source code modules, instructions), when executed by one or more processors in some embodiments, provide the functionality of one or more embodiments of the present disclosure and, in embodiments, are stored in the storage subsystem 1206. These software application modules or instructions can be executed by the one or more processors 1202. In various embodiments, the storage subsystem 1206 additionally provides a repository for storing data used in accordance with the present disclosure. In some embodiments, the storage subsystem 1206 comprises a memory subsystem 1208 and a file/disk storage subsystem 1210.

In embodiments, the memory subsystem 1208 includes a number of memories, such as a main random access memory (RAM) 1218 for storage of instructions and data during program execution and/or a read only memory (ROM) 1220, in which fixed instructions can be stored. In some embodiments, the file/disk storage subsystem 1210 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1200 includes at least one local clock 1224. The at least one local clock 1224, in some embodiments, is a counter that represents the number of ticks that have transpired from a particular starting date and, in some embodiments, is located integrally within the computing device 1200. In various embodiments, the at least one local clock 1224 is used to synchronize data transfers in the processors for the computing device 1200 and the subsystems included therein at specific clock pulses and can be used to coordinate synchronous operations between the computing device 1200 and other systems in a data center. In another embodiment, the local clock is a programmable interval timer.

The computing device 1200 could be of any of a variety of types, including a portable computer device, tablet computer, a workstation, or any other device described below. Additionally, the computing device 1200 can include another device that, in some embodiments, can be connected to the computing device 1200 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1200 for processing. Due to the ever-changing nature of computers and networks, the description of the computing device 1200 depicted in FIG. 12 is intended only as a specific example for purposes of illustrating the preferred embodiment of the device. Many other configurations having more or fewer components than the system depicted in FIG. 12 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 1200 may include any appropriate hardware, software and firmware for integrating with a data store as needed to execute aspects of one or more software applications for the computing device 1200 to handle some or all of the data access and business logic for the one or more software applications. The data store, in an embodiment, includes several separate data tables, databases, data documents, dynamic data storage schemes, and/or other data storage mechanisms and media for storing data relating to a particular aspect of the present disclosure. In an embodiment, the computing device 1200 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 1200 may provide access to content including, but not limited to, text, graphics, audio, video, and/or other content that is provided to a user in the form of HTML, XML, JavaScript, CSS, JavaScript Object Notation (JSON), and/or another appropriate language. The computing device 1200 may provide the content in one or more forms including, but not limited to, forms that are perceptible to the user audibly, visually, and/or through other senses. The handling of requests and responses, as well as the delivery of content, in an embodiment, is handled by the computing device 1200 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 1200 typically will include an operating system that provides executable program instructions for the general administration and operation of the computing device 1200 and includes a computer-readable storage medium (e.g., a hard disk, random access memory (RAM), read only memory (ROM), etc.) storing instructions that if executed (e.g., as a result of being executed) by a processor of the computing device 1200 cause or otherwise allow the computing device 1200 to perform its intended functions (e.g., the functions are performed as a result of one or more processors of the computing device 1200 executing instructions stored on a computer-readable storage medium).

In an embodiment, the computing device 1200 operates as a web server that runs one or more of a variety of server or mid-tier software applications, including Hypertext Transfer Protocol (HTTP) servers, FTP servers, Common Gateway Interface (CGI) servers, data servers, Java servers, Apache servers, and business application servers. In an embodiment, computing device 1200 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 1200 is capable of storing, retrieving, and accessing structured or unstructured data. In an embodiment, computing device 1200 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more software applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    obtaining, from a first interface provider:
        a global object variable of a first interface corresponding to a first interface type; and
        a global object variable of a second interface corresponding to a second interface type;
    determining, based on the global object variable of the first interface, a first set of object hierarchy paths;
    determining, based on the global object variable of the second interface, a second set of object hierarchy paths;
    determining a first subset of the first set of object hierarchy paths that is disjoint from the second set of object hierarchy paths;
    obtaining, from a second interface provider, an additional global object variable of an additional interface corresponding to the first interface type;
    determining, based on the additional global object variable, a second subset of object hierarchy paths;
    generating a category dictionary based on an intersection between the first subset of object hierarchy paths and the second subset of object hierarchy paths;
    generating, based on the category dictionary and the first set of object hierarchy paths, a first set of feature vectors corresponding to the first interface type;
    generating, based on the category dictionary and the second set of object hierarchy paths, a second set of feature vectors corresponding to the second interface type; and
    training a machine learning algorithm based on:
        the first set of feature vectors with the first interface type as a ground truth value; and
        the second set of feature vectors with the second interface type as the ground truth value.

2. The computer-implemented method of claim 1, further comprising determining, as a result of providing a feature vector of a third interface as input to the machine learning algorithm, that the third interface corresponds to the first interface type.

3. The computer-implemented method of claim 1, wherein an individual object hierarchy path of the first set of object hierarchy paths comprises a sequence of attributes from a base node of an object model of the first interface to an end node of the object model.

4. The computer-implemented method of claim 3, wherein each object hierarchy path in the category dictionary is different from each other object hierarchy path in the category dictionary.

5. A system, comprising:
    one or more processors;
    memory including executable instructions that, if executed by the one or more processors, cause the system to:
        determine a first object hierarchy path associated with a first interface of a first provider, the first interface being of a first type;
        determine a second object hierarchy path associated with a second interface of the first provider, the second interface being of a second type different from the first type;
        determine that the first object hierarchy path is a mismatch to the second object hierarchy path;
        obtain, from a second provider, a third object hierarchy path corresponding to an additional interface of the first type;
        generate a category dictionary based on a determination that the third object hierarchy path matches the first object hierarchy path;
        generate, based on the category dictionary and the first object hierarchy path, a first vector that corresponds to the first type; and
        generate, based on the category dictionary and the second object hierarchy path, a second vector that corresponds to the second type; and
    train a machine learning algorithm to categorize interfaces based on:
        the first vector with the first type as a ground truth value; and
        the second vector with the second type as the ground truth value.

6. The system of claim 5, wherein the executable instructions further include instructions that further cause the system to:
    generate, based on the category dictionary, an additional vector that corresponds to an additional interface;
    obtain, as a result of providing the additional vector as input to the machine learning algorithm, an indication that the additional interface corresponds to the first type; and cause, based on the indication, a device to perform an operation specific to the first type against the additional interface.

7. The system of claim 6, wherein the executable instructions further include instructions that further cause the system to provide the device with a software application that, as a result of execution of the software application by the device, causes the device to perform the operation.

8. The system of claim 6, wherein:
the executable instructions include instructions that further cause the system to obtain, from the device, a request to categorize the additional interface; and
the executable instructions that cause the cause the system to generate the additional vector are executed in response to the request.

9. The system of claim 6, wherein:
the operation specific to the first type is a first operation; and
the executable instructions further include instructions that further cause the system to:
generate, based on the category dictionary, a second additional vector that corresponds to a second additional interface;
obtain, as a result of providing the second additional vector as another input to the machine learning algorithm, a second indication that the second additional interface corresponds to the second type; and
cause, based on the second indication, the device to perform a second operation different from the first operation.

10. The system of claim 5, wherein the executable instructions that cause the system to generate the category dictionary further include instructions that further cause the system to:
determine a set of disjoint object hierarchy paths that descend from a global object variable of the first interface and do not descend from a global object variable of the second interface; and
generate the category dictionary to comprise a plurality of intersections between the set of disjoint object hierarchy paths and object hierarchy paths of the additional interface, the plurality of intersections including the first object hierarchy path.

11. The system of claim 5, wherein the category dictionary includes a set of object hierarchy paths, a first subset of the object hierarchy paths corresponding to the first type and a second subset of the object hierarchy paths corresponding to the second type.

12. The system of claim 5, wherein the first vector includes a value that indicates whether or not the first object hierarchy path is present in the category dictionary.

13. A non-transitory computer-readable storage medium having stored thereon executable instructions that, if executed by one or more processors of a computer system, cause the computer system to at least:
determine a set of intersecting object hierarchy paths between a first set of object hierarchy paths of a first interface of a first interface provider and a second set of object hierarchy paths of a second interface provided by a second interface provider, the first interface and the second interface corresponding to a first interface type;
generate a first set of feature vectors based on:
the set of intersecting object hierarchy paths; and
the first set of object hierarchy paths;

generate a second set of feature vectors based on:
the set of intersecting object hierarchy paths; and
a third set of object hierarchy paths corresponding to a third interface of the first interface provider, the third interface corresponding to a second interface type; and
train, using the first set of feature vectors and the second set of feature vectors, a machine learning algorithm to distinguish between feature vectors corresponding to the first interface type and feature vectors corresponding to a second interface type different from the first interface type.

14. The non-transitory computer-readable storage medium of claim 13, wherein the executable instructions further include instructions that further cause the computer system to:
obtain source code of the first interface and of the third interface;
determine, based on the source code, the first set of object hierarchy paths that:
descend from a first global object variable that corresponds to the first interface; and
do not descend from a second global object variable that corresponds to the second interface; and
determine, based on different source code of a different interface provided by the second interface provider and the second portion of the source code, the second set of object hierarchy paths.

15. The non-transitory computer-readable storage medium of claim 13, wherein the first interface is a web page.

16. The non-transitory computer-readable storage medium of claim 13, wherein the machine learning algorithm includes at least one of:
a gradient boosted decision tree,
a logistic regression, or
an artificial neural network.

17. The non-transitory computer-readable storage medium of claim 13, wherein:
the executable instructions further include instructions that further cause the computer system to generate a dictionary of interface types based at least in part on the first set of feature vectors and the second set of feature vectors; and
the executable instructions that cause the computer system to train the machine learning algorithm further cause the computer system to train the machine learning algorithm using the dictionary.

18. The non-transitory computer-readable storage medium of claim 17, wherein the executable instructions further include instructions that further cause the computer system to:
generate, based on the dictionary, a vector that corresponds to an additional interface;
provide the vector as input to the machine learning algorithm; and
obtain, from the machine learning algorithm, an indication that the additional interface is of the first interface type.

19. The non-transitory computer-readable storage medium of claim 18, wherein the executable instructions further include instructions that further cause the computer system to cause, as a result of obtaining the indication, a device to perform an operation specific to the first interface type against the additional interface.

20. The non-transitory computer-readable storage medium of claim 19, wherein the operation includes at least one of:

storing a Uniform Resource Identifier corresponding to the additional interface,
extracting, from the additional interface, a value from an interface object associated with interfaces of the first type, or
simulating human interaction with the interface object associated with the interfaces of the first interface type.

* * * * *